United States Patent [19]

Yumoto

[11] Patent Number: 5,800,907
[45] Date of Patent: Sep. 1, 1998

[54] METHOD OF PRODUCING LENS METHOD OF FABRICATING ARTICLE WITH LENS ARTICLES WITH LENS RESIN COMPOSITION FOR FORMING DEFINING LINES AND LENS-FORMING RESIN COMPOSITION

[75] Inventor: Yoshihide Yumoto, Tokyo, Japan

[73] Assignee: Grapac Japan Co., Inc., Tokyo, Japan

[21] Appl. No.: 619,610

[22] PCT Filed: Sep. 30, 1994

[86] PCT No.: PCT/JP94/01634

§ 371 Date: May 23, 1996

§ 102(e) Date: May 23, 1996

[87] PCT Pub. No.: WO95/09372

PCT Pub. Date: Apr. 6, 1995

[30] Foreign Application Priority Data

Sep. 30, 1993 [JP] Japan ................. 5-268091

[51] Int. Cl.$^6$ ............................ B32B 3/00
[52] U.S. Cl. .................... 428/195; 264/1.32; 264/1.7; 264/1.9; 359/619; 427/162; 427/163.3; 427/428; 428/199; 428/201; 430/321
[58] Field of Search .............. 264/1.32, 1.7, 264/1.9; 427/162, 163.3, 164, 258, 261, 428; 430/321, 324, 330; 359/619; 428/195, 199, 201

[56] References Cited

U.S. PATENT DOCUMENTS 5,458,820 10/1995 Lefebvre ............................. 264/1.7
5,536,455 7/1996 Aoyama et al. ................ 427/162 X

FOREIGN PATENT DOCUMENTS 2262601 10/1990 Japan.
4190301 7/1992 Japan.

Primary Examiner—Michael Lusignan
Attorney, Agent, or Firm—Browdy and Neimark

[57] ABSTRACT

A lens body or article with lens is produced by forming lens-forming defining lines on the surface of a substrate, coating a lens-forming resin on the surface to thereby allow the lens-forming resin to swell in a convex form between the lens-forming defining lines by means of the repellency of the lens-forming resin with the lens-forming defining lines, and then curing the lens-forming resin. To this method is added a step of providing an image on the substrate to obtain an article with lens having the image. The image can stereoscopically be seen through the article with lens obtained by this method.

24 Claims, 9 Drawing Sheets

METHOD OF PRODUCING LENS METHOD OF FABRICATING ARTICLE WITH LENS ARTICLES WITH LENS RESIN COMPOSITION FOR FORMING DEFINING LINES AND LENS-FORMING RESIN COMPOSITION

TECHNICAL FIELD OF THE INVENTION

The present invention relates to a method of producing a lens, method of fabricating an article with lens, the article with lens, a resin composition for forming defining lines and a resin composition for forming a lens.

More particularly, the present invention relates to a method of producing a lens allowing one to recognize plane images such as pictures, designs, colors and combinations thereof as being stereoscopic or three-dimensional images, or recognize an image selected depending upon an angle of observation from a plurality of sets of different images. This lens may be such as to allow one to view such an animation that a shape is continuously changed or discontinuous images appear in succession, or to be used for a transmission screen for use in projectors or television sets or for use as a reflection or diffusion plate. This method can secure the easy or desirable application of suitable lens on lens-forming surfaces. Furthermore, the present invention relates to a method of fabricating an article with the lens and the article with the lens, by which article two-dimensional images comprising pictures, designs, colors and combinations thereof can be viewed in a stereoscopic or three-dimensional fashion, or a plurality of sets of different images can be viewed selectively depending upon an angle of view so that these selected images may look an animation, e.g., an image may continuously be changed or irrelevant images may successively be viewed. Still further, the present invention relates to a resin or resin composition suitable for forming lens-forming defining lines on a substrate which are adequately fine to provide a good repellency for the resin or resin composition for forming the lens. Finally, the present invention relates to a lens-forming resin composition from which the articles with the lens and fine lens for use in the article.

BACKGROUND OF THE INVENTION

Hitherto has been known a so-called lenticular lens which comprises a plurality of fairly fine columnar convex lenses flatly arranged so that two-dimensional images comprising pictures, designs, colors and combinations thereof may be viewed in a three-dimensional or stereoscopic fashion, or a plurality of different images may selectively be viewed depending upon an angle of view.

This lens comprises a plurality of fairly fine convex lenses aligned on the surface of a lens sheet made by heating and pressing in a metal mold. Furthermore, on the side of this lens sheet opposite to the side thereof having the lenses is applied a sheet having printed thereon pictures, designs and/or colors for images to be viewed in a stereoscopic fashion, thereby allowing one to view plane or two-dimensional images in a three-dimensional or stereoscopic fashion, or to view a plurality of different still images in an animated fashion by changing the angle of his viewing.

However, there is such a problem that costs for production of such lenses as mentioned above, such as lenticular lens, flyeye lens or Fresnel lens in different sizes and shapes are fairly high, because a metal mold must be provided for each of the lenses. In such an article with a lenticular lens as mentioned above, the pitch of the convex lenses are not only required to comply with that of images such as pictures, designs or colors, but also each of the convex lenses is required to exactly correspond to visual expressions such as pictures, designs or colors so as to clearly recognize the visual expressions. However, it was highly complex and difficult to fabricate such an article with lenticular lens, particularly the article of a large size. The large article with a lenticular lens was hardly fabricated with an increased amount of errors due to shrinkage. That is, shrinkage may occur in a lens sheet itself, or expansion and/or shrinkage may occur in a lens sheet when a sheet material is to be applied to the lens sheet. Therefore, there was a difficulty in putting the lens sheet on the sheet material to adjust the convex lenses of the lens sheet to designs on the sheet material exactly overall, and there is also such a problem that the article with lens is fabricated at a relatively high cost. In addition, it is not easy to put the lenses on desired areas or set the lenses on the sheet material at proper positions.

The present invention has been made to solve the aforementioned problems.

The object of the present intention is to provide a method of producing a lens such as a lenticular lens, flyeye lens or Fresnel lens with ease without using a metal mold. The object of the present invention is to provide a method of producing a lens at a desired area or position. The object of the present invention is to provide a method of producing a lens comprising fine lens sections of 3 mm or less in pitch width. The object of the present invention is to provide a method of producing a lens while achieving all the aforementioned objects.

The object of the present invention is to provide a method of fabricating an article with lens with ease without using a metal mold. The object of the present invention is to provide a method of fabricating an article with lens at a desired area or position. The object of the present invention is to provide a method of fabricating an article with lens comprising fine lens sections of 3 mm or less in pitch width allowing one to clearly view images through the lens corresponding to the images. The object of the present invention is to provide a method of fabricating an article with lens while achieving all the aforementioned objects.

The object of the present invention is to provide an article with lens produced without using a metal mold. The object of the present invention is to provide an article with lens by which one can stereoscopically view an image. The object of the present invention is to provide an article with lens which is fabricated in a desired size at a desired position and by which one can stereoscopically and clearly view an image or individually view a plurality of images. The object of the present invention is to provide an article with lens comprising fine lens sections of 3 mm or less in pitch width allowing one to clearly view images through the lens corresponding to the images. The object of the present invention is to provide an article with lens while achieving all the aforementioned objects.

The object of the present invention is to provide a resin composition for forming defining lines, which can suitably be used in the method of producing a lens or the method of fabricating an article with lens. The object of the present invention is to provide a resin composition for forming defining lines from which fine lens sections of 3 mm or less in pitch width can easily be made. The object of the present invention is to provide a resin composition for forming defining lines capable of suitably forming fine defining lines and effectively repelling a lens-forming resin composition.

The object of the present invention is to provide a resin composition for forming fine defining lines, while achieving all the aforementioned objects.

The object of the present invention is to provide a lens-forming resin composition suitable for use in producing the lens and fabricating the article with the lens. The object of the present invention is to provide a lens-forming resin composition from which the lens sections of 3 mm or less in pitch width can easily be formed. The object of the present invention is to provide a curable lens-forming resin composition from which the lens comprising fine lens sections can easily be formed, the resin composition having a low shrinkage when cured and an easily adjustable refractive index. The object of the present invention is to provide a lens-forming resin composition, while achieving all the aforementioned objects.

DISCLOSURE OF THE INVENTION

To achieve the objects above, according to the first embodiment of the present invention, is provided a method of producing a lens, which comprises:

(1) a defining lines-forming step of providing lens-forming defining lines on the surface of a substrate on which the lens is to be formed, and (2) a lens-forming step of coating the surface of the substrate with a lens-forming resin composition having an angle of contact of at least 15 with the material for forming the lens-forming defining lines, to thereby form a lens-forming layer in a convex form onto areas defined by the lens-forming defining lines, and curing the lens-forming layer, to thereby form a plurality of lens sections.

According to the second embodiment of the present invention, is provided a method of forming a lens, which comprises the defining lines-forming step (1) and the lens-forming step (2) of the first embodiment above, followed by:

(3) a top surface-flattening step of coating the upper surface of a plurality of the lens sections with a filler resin composition having a refractive index different from that of the lens-forming resin composition to thereby form a filler layer having a flat top surface on the upper surface of the lens sections, (4) a top defining lines-forming step of providing lens-forming defining lines on the upper surface of the filler layer, and (5) a top lens-forming step of coating the filler layer with a lens-forming resin composition having an angle of contact of at least 15° with the material of the lens-forming defining lines made in the top defining lines-forming step to thereby form a lens-forming layer in a convex form on the areas defined by the defining lines formed above, and curing the lens-forming layer to form the upper lens sections, a series of these lens-forming steps being repeated at least one time to obtain a lens laminate.

According to the third embodiment of the present invention, is provided a method of producing a lens, which comprises the defining lines-forming steps (1) and the lens-forming step (2) of the first embodiment above, followed by:

(3) a top lens-forming step of coating the surface of the lens sections formed in the lens-forming step (2) above with a lens-forming resin composition having an angle of contact of at least 15° with the material used in the defining lines-forming step (1) above for forming the defining lines, to form an upper lens-forming layer at the areas defined by the lens-forming defining lines, and curing the upper lens-forming layer to form the upper lens sections, a series of these lens-forming steps being repeated at least one time to obtain a lens laminate.

According to the fourth embodiment of the present invention, is provided a method of producing a lens, which comprises the defining lines-forming step (1) and the lens-forming step (2) of the first embodiment above, followed by:

(3) a top defining lines-forming step of forming additional defining lines on the lens-forming defining lines, and (4) a top lens-forming step of coating the surface of the lens sections already formed with a lens-forming resin composition having an angle of contact of at least 15° with the material used in the top defining lines-forming step above for forming the lens-forming defining lines, to thereby form a lens-forming layer in a convex form at the areas defined by the lens-forming defining lines formed in the top defining lines-forming step, and curing the lens-forming layer to form the lens sections, a series of the lens-forming steps being repeated at least one time to obtain a lens laminate.

According to the fifth embodiment of the present invention, is provided a method of producing a lens, which comprises the defining lines-forming step (1) and the lens-forming step (2) of the first embodiment above, followed by:

(3) a top defining lines-forming step of providing additional defining lines on the defining lines already formed and the lens sections already formed, and (4) a top lens-forming step of coating the surface of the lens sections already formed, with a lens-forming resin composition having an angle of contact of at least 15° with the material used in the top defining lines-forming step above for forming the defining lines, to thereby form an additional lens-forming layer in a convex form at the areas defined by the lens-forming defining lines formed in the top defining lines-forming step above, and curing the lens-forming layer to form the lens sections, a series of the lens-forming steps being repeated at least one time to obtain a lens laminate.

According to the sixth embodiment of the present invention, is provided a method of producing a lens, which comprises the defining lines-forming step (1) and the lens-forming step (2) of the first embodiment above, followed by:

(3) a top defining lines-forming step of providing additional lens-forming defining lines, on the lens sections already formed, and (4) a top lens-forming step of coating the surface of the lens sections and the surface of the lens-forming defining lines between the lens sections already formed with a lens-forming resin composition having an angle of contact of at least 15° with the material used in the top defining lines-forming step above for forming the defining lines, to thereby form an additional lens-forming layer in a convex form at the areas defined by the lens-forming defining lines formed in the top defining lines-forming step above, and curing the lens-forming layer to form the lens sections, a series of the lens-forming steps being repeated at least one time to obtain a lens laminate.

According to the seventh embodiment of the present invention, is provided a method of producing a lens defined in any of the first to sixth embodiments above, wherein the aforementioned substrate used in these embodiments is a laminate comprising a transparent layer and a base sheet. If the base sheet is transparent, one or both of the transparent layer and the base sheet may have the lens formed on the surface thereof. If the base sheet is opaque, the transparent sheet has the lens formed thereon.

According to the eighth embodiment of the present invention, is provided a method of producing a lens defined in any of the first to seventh embodiments above, wherein the lens-forming defining lines constitute a repeated pattern.

According to the ninth embodiment of the present invention, is provided a method of producing a lens defined in the eighth embodiment above, wherein the repeated pattern of the defining lines for producing the lens is constituted by parallel curved or straight lines.

According to the tenth embodiment of the present invention, is provided a method of producing a lens defined in the eighth embodiment above, wherein the repeated pattern of the defining lines for producing the lens is constituted by circles or polygons.

According to the eleventh embodiment of the present invention, is provided a method of producing a lens defined in any of the first to tenth embodiments above, wherein at least one of the lens-forming defining lines and the lens-forming layer is formed by a way of coating with a roll coater or printing.

According to the twelfth embodiment of the present invention, is provided a method of producing a lens defined in the second embodiment above, wherein the filler layer is formed by a way of coating with a roll coater or printing.

According to the thirteenth embodiment of the present invention, is provided a method of producing a lens defined in any of the seventh to twelfth embodiments, wherein the transparent layer is laminated on the base sheet by a way of coating with a roll coater or printing.

According to the fourteenth embodiment of the present invention, is provided a method of fabricating an article with lens, which comprise:

(1) an image-making step of making an image on a substrate,
(2) a defining lines-forming step of forming lens-forming defining lines on the surface of the substrate having the image obtained in the image-making step above, on which the lens is to be formed, and
(3) a lens-forming step of coating the surface of the substrate on which the lens is to be formed with a lens-forming resin composition having an angle of contact of at least 15° with the material for forming the lens-forming defining lines, to thereby form a lens-forming layer in a convex form onto areas defined by the lens-forming defining lines, and curing the lens-forming layer, thereby forming a plurality of lens sections.

According to the fifteenth embodiment of the present invention, is provided a method of fabricating an article with lens, which comprises:

(1) an image-making step of making an image on a substrate,
(2) a transparent layer-laminating step of forming a transparent layer on the surface of the substrate having the image obtained in the image-making step,
(2-1) a defining lines-forming step of forming lens-forming defining lines on the surface of the transparent layer obtained in the transparent layer-laminating step, and
(3) a lens-forming step of coating the surface of the substrate on which the lens is to be formed with a lens-forming resin composition having an angle of contact of at least 15° with the material for forming the lens-forming defining lines, to thereby form a lens-forming layer in a convex form onto areas defined by the lens-forming defining lines, and curing the lens-forming layer, thereby forming a plurality of lens sections.

According to the sixteenth embodiment of the present invention, is provided a method of fabricating an article with lens, defined in the fourteenth or fifteenth embodiment, wherein the image obtained in the image-making step (1) comprises a plurality of divided images, and the lens-forming defining lines obtained in the lens-forming step (3) are formed for every divided images.

According to the seventeenth embodiment of the present invention, is provided a method of fabricating an article with lens, defined in any of the fourteenth to sixteenth embodiments above, wherein the lens-forming step (3) is followed by:

(4) a top surface-flattening step of coating a plurality of the lens sections thereon with a filler resin composition having a refractive index different from that of the lens-forming resin composition, to thereby from a filler layer having a flat upper surface,
(5) a top defining lines-forming step of providing the lens-forming defining lines on the surface of the filler layer, and
(6) a top lens-forming step of coating the surface of the lens sections already formed, with a lens-forming resin composition having an angle of contact of at least 15° with the material used in the defining lines-forming step above for forming the defining lines, to thereby form an additional lens-forming layer in a convex form at the areas defined by the lens-forming defining lines formed in the defining lines-forming step above, and curing the lens-forming layer to form the lens sections, a series of the lens-forming steps being repeated at least one time to obtain a lens laminate.

According to the eighteenth embodiment of the present invention, is provided a method of fabricating an article with lens, defined in any of the fourteenth to sixth embodiments above, wherein the lens-forming step (3) above is followed by:

(4) a top lens-forming step of coating the surface of the lens sections already formed, with a lens-forming resin composition having an angle of contact of at least 15° with the material used in the defining lines-forming step above for forming the defining lines, to thereby form a top lens-forming layer in a convex form at the areas defined by the lens-forming defining lines formed in the defining lines-forming step above, and curing the top lens-forming layer to form the top lens sections, a series of the top lens-forming steps being repeated at least one time to obtain a lens laminate.

According to the nineteenth embodiment of the present invention, is provided a method of fabricating an article with lens, defined any of the fourteenth to sixteenth embodiments above, wherein the lens-forming step (3) above is followed by:

(4) a top defining lines-forming step of further providing lens-forming defining lines on lens-forming defining lines, and (5) a top lens-forming step of coating the surface of the lens sections already formed, with a lens-forming resin composition having an angle of contact of at least 15° with the material used in the top defining lines-forming step above for forming the defining lines, to thereby form an additional lens-forming layer in a convex form at the areas defined by the lens-forming defining lines formed in the top defining lines-forming step above, and curing the lens-forming layer to form the lens sections, a series of the lens-forming steps being repeated at least one time to obtain a lens laminate.

According to the twentieth embodiment of the present invention, is provided a method of fabricating an article with lens, defined in any of the fourteenth to sixteenth embodiments above, wherein the lens-forming step (3) is followed by:

(4) a top defining lines-forming step of further providing lens-forming defining lines on the lens-forming defining lines already formed and the lens sections already formed above, and (5) a top lens-forming step of coating the surface of the lens sections already formed, with a lens-forming resin composition having an angle of contact of at least 15° with the material used in the top defining lines-forming step above for forming the defining lines, to thereby form an additional lens-forming layer in a convex form at the areas defined by the lens-forming defining lines formed in the top defining lines-forming step above, and curing the lens-forming layer to form the lens sections, a series of the lens-forming steps being repeated at least one time to obtain a lens laminate.

According to the twenty first embodiment of the present invention, is provided a method of fabricating an article with lens, defined in any of the fourteenth to sixteenth embodiments above, wherein the lens-forming step (3) is followed by:

(4) a top defining lines-forming step of further providing lens-forming defining lines on the lens sections already formed, and (5) a top lens-forming step of coating the surface of the lens sections already formed, with a lens-forming resin composition having an angle of contact of at least 15° with the material used in the top defining lines-forming step above for forming the defining lines, to thereby form an additional lens-forming layer in a convex form at the areas defined by the lens-forming defining lines formed in the top defining lines-forming step above, and curing the lens-forming layer to form the lens sections, a series of the lens-forming steps being repeated at least one time to obtain a lens laminate.

According to the twenty second embodiment of the present invention, is provided a method of fabricating an article with lens, defined in any of the fourteenth to twenty first embodiments above, wherein the aforementioned substrate used in these embodiments is a laminate comprising a transparent layer and a base sheet. If the base sheet is transparent, one or both of the transparent layer and the base sheet may have the lens formed on the surface thereof. If the base sheet is opaque, the transparent sheet has the lens formed thereon.

According to the twenty third embodiment of the present invention, is provided a method of fabricating an article with lens, defined in any one of the fourteenth to twenty second embodiments above, wherein the lens-forming defining lines constitute a repeated pattern.

According to the twenty fourth embodiment of the present invention, is provided a method of producing an article with lens, defined in the twenty third embodiment above, wherein the repeated pattern of the defining lines for producing the lens is constituted by parallel curved or straight lines.

According to the twenty fifth embodiment of the present invention, is provided a method of fabricating an article with lens, defined in the twenty third embodiment above, wherein the repeated pattern of the defining lines for producing the lens is constituted by circles or polygons.

According to the twenty sixth embodiment of the present invention, is provided a method of fabricating a lens, defined in any of the fourteenth to twenty fifth embodiments above, wherein at least one of the lens-forming defining lines and the lens-forming layer is formed by a way of coating with a roll coater or printing.

According to the twenty seventh embodiment of the present invention, is provided a method of fabricating an article with lens, defined in the seventeenth embodiment above, wherein the filler layer is formed by a way of coating with a roll coater or printing.

According to the twenty eighth embodiment of the present invention, is provided a method of fabricating an article with lens, defined in any one of the twenty second to twenty seventh embodiments above, wherein the transparent layer is laminated on the base sheet by a way of coating with a roll coater or printing.

According to the twenty ninth embodiment of the present invention, is provided an article with lens, which has the same structure as produced or fabricated as defined in the first to twenty eighth embodiments above.

According to the thirtieth embodiment of the present invention, is provided a resin composition for forming the defining lines, which has an angle of contact of at least 6° with a normal dodecan, a viscosity of at most 1,000 cps (25° C.) and a tackiness of 20 or less.

According to the thirty first embodiment of the present invention, is provided a lens-forming resin composition, which contains a polymeric substance and has an angle of contact of at least 15° with the defining lines-forming resin composition as defined in the thirtieth embodiment above.

According to the thirty second embodiment of the present invention, is provided a lens-forming resin composition defined in the thirty first embodiment above, wherein the polymeric substance is a polymerizable monomer.

According to the thirty third embodiment of the present invention, is provided a lens-forming resin composition defined in the thirty first or second embodiment above, which has a viscosity of 20 to 1,000 cps (25° C.) and a number of colors of 1 to 10 as measured by the Gardener's method.

Figure 1:
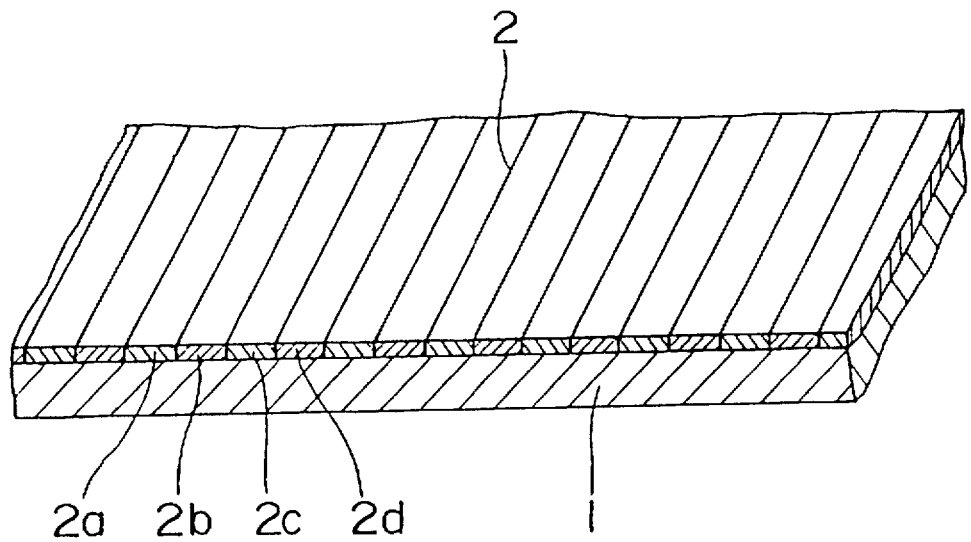
FIG. 1 is a perspective view of a substrate and image formed on the surface of the substrate in the method of fabricating an article with lens.

BEST MODES FOR PRACTICING THE INVENTION (A) Method of Producing a Lens

This method of producing a lens comprises (1) a defining lines-forming step and (2) a lens-forming step.

(1) Defining Lines-Forming Step

The defining lines-forming step (1) comprises providing defining lines for forming a lens on the surface of a substrate on which the lens is to be formed.

The substrate has a function of supporting the lens. The substrate may comprise a single layer or a laminate consisting of a plurality of layers, which can be chosen depending upon use of the lens produced according to the method of producing a lens of the present invention.

If the substrate comprises a single layer, then it may be transparent or opaque. When the lens produced according to the method of the present invention is used for a transmission screen, etc., the substrate is desirably transparent. When the lens produced according to the method of the present invention is used for a reflective plate, etc., the substrate is desirably opaque.

The materials of the substrate are not limited as far as they can be adhered to the lens-forming defining lines and the lens-forming resin composition mentioned below. For example, as such materials reference may be made to a synthetic resin, metal, paper, wood, pottery, porcelain, glass, coating of paints on the various materials, composites of the various materials, or etc.

If the substrate is a laminate comprising a plurality of layers, then it may be a substrate comprising a base sheet and a transparent layer in a preferred embodiment. The material of the base sheet may be transparent or opaque, and for example, it may be of a synthetic resin, metal, paper, wood, glass, or etc. In the optical point of view, the transparent layer has a function of regulating the focal length of the lens sections, and in the mechanical point of view, it has a function of imparting a flexibility and realizing a so-called "toughness.". The material of the transparent layer is not particularly limited as far as any or all of these functions are satisfied. Reference may be made to the synthetic resins.

When the base sheet is transparent, the lens is formed on the surface of one of the transparent layer and the base sheet. When the base sheet is opaque, the lens is formed on the surface of the transparent layer.

The lens may be formed on one side or opposite sides of the substrate.

The lens-forming surface of the substrate may preferably be as flat as possible. The preferred flatness or evenness of the lens-forming surface may be determined with an arithmetic mean roughness (Ra value) and a maximum height (Ry value) standardized by JIS B 0601.

The Ra value preferred for the lens-forming surface of the substrate is preferably in the range of 0.001–5, particularly preferably 0.002–0.6, and the Ry value is preferably 0.001–28, particularly preferably 0.002–3. If desired, the Ra value may preferably be in the range of 0.001–0.6 or 0.002–5, and the Ry value may preferably be in the range of 0.002–28 or 0.001–3.

When the flatness or evenness of the lens-forming surface of the substrate is within the aforementioned ranges, the formation of the lens-forming defining lines can effectively be made by a way of coating with a roll coater or printing. If the flatness or evenness of the lens-forming surface is poor, then the function of the whole of the finally produced lens sections may be damaged.

The flatness or evenness expressed by the two aforementioned values standardized by JIS B 0601 is measured by Surfcom 590A made by Tokyo Precision K.K. and a phase-compensating type filter (Gaussian) adopting cut-off values for each of the materials to be measured.

Before forming the lens-forming defining lines on the lens-forming surface of the substrate, a transparent layer may be formed on the surface of the substrate. This transparent layer may have a function of adjusting the lens function of the lens sections mentioned below.

The lens-forming defining lines have a function of allowing the lens-forming resin composition coated on the lens-forming surface to be repelled and swell in a convex form at areas enclosed by or gotten between the lens defining lines. For forming the lens-forming defining lines may be used various materials which form adequately fine defining lines capable of repelling the lens-forming resin composition, which will be mentioned below, with good adhesion on the substrate. For example, the materials preferred for forming the lens-forming defining lines may be a rosin-modified phenol resin, urea resin, melamine resin, ketone resin, polyvinyl chloride resin (PVC), vinyl chloride-vinyl acetate copolymer resin, polyvinyl butyral resin (butyral resin), styrene-maleate resin, polypropylene chloride, acrylic resin, coumarone-indene resin, petroleum resin, polyester resin, alkyd resin, polyamide resin, epoxy resin, polyurethane, nitrocellulose, ethyl cellulose, ethyl hydroxy ethyl cellulose (EHEC), cyclic rubber, chlorinated rubber, or etc.

The lens-forming defining lines have a repeated pattern, which varies depending upon the shape of the lens to be formed.

For example, when a lenticular lens is to be produced, the lens-forming defining lines are lines which are positioned in parallel with each other at a predetermined pitch interval. These parallel lens-forming defining lines may be straight lines, bow-shaped curves, or zig-zag lines. In the case of producing the lenticular lens, normally the lens-forming defining lines comprise straight lines mutually in parallel at a predetermined pitch interval.

In the case of producing a flyeye lens, the lens-forming defining lines constitute a repeated pattern comprising circles or polygons. The polygon-repeated pattern is appropriate for a honeycomb pattern. The shape of the basic unit of this polygon-repeated pattern may be hexagonal, pentagonal, tetragonal, or trigonal, in which this basic unit is repeated.

In the case of producing the Fresnel lens, the lens-forming defining lines may be a repeated pattern constituted by a plurality of concentric circles.

The width of the lens-forming defining lines may be in the range of 1–500 μm, preferably 1–400 μm or, as desired, 1–300 μm, 1–200 μm or 1–100 μm. If the width of the lens-forming defining lines is too large, the area surface on which the lens is not formed increases so that the function of the lens may be reduced. If the width of the lens-forming defining lines is excessively small, then the lens-forming resin composition coated between the lens-forming defining lines extends over the adjacent area defined by the lens-forming defining lines, so that there may be a difficulty in forming the lens sections at every areas defined by the lens-forming defining lines. When the width of the lens-forming defining lines is within the aforementioned range, the lens sections can separately be formed with ease at every areas defined by the lens-forming defining lines.

When the distance between a lens-forming defining line and the adjacent lens-forming defining line, i.e., a pitch interval is in the range of 10–150 μm, so fine a lenticular lens that one cannot recognize the unevenness of the surface of the lens when he touches the surface with his fingers can be produced.

The method of forming the lens-forming defining lines is not limited, but it may preferably be an etching or printing method. More preferably the printing method is employed. The printing method may include, for example, lithographic printing, letterpress printing, intaglio printing, gravure printing, screen printing, mimeographic printing, or etc. The lens-forming defining lines having so fine a pitch interval or line width are preferably formed by the lithographic printing or gravure printing.

(2) Lens-Forming Step

In the lens-forming step, a lens-forming resin composition having an angle of contact of at least 15° with the lens-forming defining lines is firstly coated onto the lens-formed surface having the lens-forming defining lines formed thereon in the aforementioned defining lines-forming step. The lens-forming resin composition will be mentioned below.

The angle of contact above is measured by a method in which a resin or resin composition for forming the defining lines is coated in the form of a uniform film with a proper means such as a roll coater onto a horizontal surface of the substrate, a predetermined amount of the lens-forming resin composition is dropped on the resultant film, and the angle made by the surface of the droplet of the lens-forming resin composition present on the film is measured at the inside of the lens-forming resin composition. The stopping of the fluidization and diffusion of the lens-forming resin composition dropped on the film is visually confirmed and then the lens-forming resin composition is cured through a proper means. The resultant cured product is photographically recorded at the side thereof or the cross-sectional shape of the product is observed by a contour measuring machine. The height h of the cured product and the diameter d of the circle made by a line of contact with the horizontal plane are determined. The angle of contact is determined by the equation of tan $(\theta/2)=2h/d$.

The lens-forming resin composition may be coated by various methods such as dipping, brushing, spraying, coating with a roll coater, printing and etc. A preferred method is a method of coating with a roll coater or a printing method. As the printing method reference may be made to, for example, lithographic printing, letterpress printing, intaglio printing, gravure printing, screen printing, mimeographic printing, etc. When the interval of the lens-forming defining lines is fine as mentioned above, the thickness of the lens-forming resin composition coated may be in the range of 0.3–500 μm, preferably 0.5–100 μm. As desired, the thickness of the lens-forming resin composition coated may be properly in the range of 0.3–200 μm or 0.3–50 μm.

Coating of the lens-forming resin composition with such a range of thickness as mentioned above allows the lens-forming defining lines to repel the lens-forming resin composition. Therefore, the lens-forming resin composition is swollen in a convex form at the areas defined by the lens-forming defining lines so that the lens-forming resin composition may function as a lens to form a lens-forming layer.

After the lens-forming resin composition is coated, the resultant lens-forming layer is cured. This curing may be either thermal curing or radiation curing. The radiation curing is preferred for curing the lens-forming resin composition employed in the present invention as mentioned below. Examples of the radiation are ultraviolet ray, electron beam, etc. The conditions for the radiation curing will be mentioned below in connection with the lens-forming resin composition of the present invention.

When the curing of the lens-forming layer is completed, a lens body comprising lens sections formed on the substrate is produced.

The process explained above provides a lens body in the form of a single layer comprising a plurality of lens sections on a substrate. Repeating this process at least one time provides a lens body comprising a plurality of layers laminated, the layers comprising lens sections formed on a substrate.

This lens-laminating process will be illustrated below.

(3) Lens-Laminating Process—No. 1—

This lens-laminating process comprises:

(i) the top surface-flattening step of forming a filler layer having a flat surface by coating a plurality of the lens sections with a filler resin composition having a refractive index different from that of the lens-forming resin composition, (ii) the top defining lines-forming step of providing the lens-forming defining lines on the surface of the filler layer, and (iii) the top lens-forming step of forming lens sections by coating the surface of the filler layer with a lens-forming resin composition having an angle of contact of at least 15° with the lens-forming defining lines formed in the top defining lines-forming step above.

(i) Top Surface-Flattening Step

In this step, the filler resin composition is coated on the lens sections in a lens body obtained in the lens-forming step.

The filler resin composition preferably has a refractive index different from that of the lens-forming resin composition used in the lens-forming step. The filler resin composition may comprise the same or different components from those of the lens-forming resin composition, and the resin composition having a refractive index regulated by changing the amounts of the components may properly be used.

Coating the filler resin composition onto the lens sections may be carried out by various ways such as dipping, brushing, spraying, coating with a roll coater or printing. Of these ways the way of coating with a roll coater and the way of printing are preferred. As the way of printing reference may be made to, for example, lithographic printing, letterpress printing, intaglio printing, gravure printing, screen printing, mimeographic printing, etc.

The thickness of the filler resin composition coated can properly be decided depending upon the refractive index of the filler resin composition. The filler layer obtained by using the filler resin composition also has a function of adjusting a lens focus and hence decision of the thickness depends on the relation thereof to the focuses of the multi-staged lens sections.

The filler layer made of the filler resin composition may function as a base for forming the lens-forming defining lines on the flat top surface of the layer and also often function as a concave lens. Therefore, the thickness of the filler resin composition coated is required to be equal to or larger than that of the lens sections formed in the lens-forming step above. If the thickness of the filler resin composition coated is smaller than that of the lens sections, then the upper surface of the filler layer may be corrugated, or the convex surface of the lens may become uneven.

When the lens-forming resin composition as mentioned below is modified and used as the filler resin composition, the filler resin composition is radiation-cured to form the filler layer. The radiation used for the curing may include an ultraviolet-ray and electron beam.

The formed filler layer is transferred to the subsequent top defining lines-forming step.

(ii) Top Defining Lines-Forming Step

This top defining lines-forming step is a step of forming the lens-forming defining lines on the flat top surface of the filler layer. This step is substantially the same as the defining lines-forming step mentioned above, except that the flat top surface of the filler layer is used in place of the substrate as the surface on which the lens-forming defining lines are formed. Accordingly, no explanation is made on this step.

The lens-forming defining lines formed in this step may be on the flat top surface of the filler layer and, as required by designed function of the lens, may be just above the lens-forming defining lines already made or on a position deviated from the position just above the lens-forming defining lines already made. In the case where the refractive index of the lens is raised, the lens-forming defining lines are preferably formed on the position just above the lens-forming defining lines already made.

(iii) Top Lens-Forming Step

This top lens-forming step comprises the steps of coating onto the surface of the filler layer a lens-forming resin composition having an angle of contact of at least 15° with the lens-forming defining lines already formed in the aforementioned top defining lines-forming step, forming a convex lens-forming layer on the area defined by the lens-forming defining lines and curing the lens-forming layer, thereby forming the lens sections.

This top lens-forming step is substantially the same as the aforementioned lens-forming step.

However, the lens-forming resin composition for forming the lens sections may be the same as the lens-forming resin composition already used for forming the lowermost lens sections, but this resin composition to be used may have a different refractive index from that of the lens-forming resin composition used for forming the lowermost lens sections by changing the components or proportion of the components of the lens-forming resin composition used for forming the lowermost lens sections.

One of the objects for providing the filler layer and multi-staged lens sections on the substrate is to regulate the optical properties which cannot be regulated by a monolayered lens. Therefore, the composition or proportion of the components of the lens-forming resin composition used for forming the lens sections in the second stage or subsequent stages is preferably decided taking into account the refractive index in the second stage or each stage of the subsequent stages, so as to achieve the desired lens function taking into account the refractive index of the first-stage lens sections and the refractive index of the filler layer.

The lens-laminating step comprising a series of (i) the top surface-flattening step, (ii) the top defining lines-forming step and the top lens-forming step may be carried out one time or many times.

The lens body can be produced by the method of producing a lens as mentioned above.

(4) Lens-Laminating Process—No. 2—

This lens-laminating step comprises:

(i) coating a lens-forming resin composition having an angle of contact of at least 15° with the material for forming the lens-forming defining lines already formed in the defining lines-forming step as mentioned above to form a convex lens-forming layer at the area defined by the lens-forming defining lines, and curing the resultant lens-forming layer to form the top lens sections. This top lens-forming step is repeated at least one time.

In summary, this lens-laminating step comprises utilizing the lens-forming defining lines having been formed on the substrate, coating and curing the lens-forming resin composition between the lens-forming defining lines, repeating a predetermined number of times the coating and curing of the lens-forming resin composition on the lens sections formed by the previous coating and curing, to thereby forming the lens sections having a desired function.

In general, the lens-forming resin composition to be coated on the substrate or on the lens sections already formed is easier to handle as its viscosity is lower. The lower viscosity renders the coating film uniform.

Therefore, this lens-laminating step can make a uniform coating film, i.e., uniform lens sections from a low viscosity and easy handling lens-forming resin composition, on a substrate or lens sections already formed.

(5) Lens-Laminating Step—No. 3—

This lens-laminating step comprises the defining lines-forming step (1) and the lens-forming step (2) mentioned above, followed by:

(i) the top defining lines-forming step of further providing lens-forming defining lines on the lens-forming defining lines, and
(ii) the top lens-forming step of coating the surface of the lens sections already formed with a lens-forming resin composition having an angle of contact of at least 15° with the material for forming the lens-forming defining lines formed in the top defining lines-forming step mentioned above, to form a convex lens-forming layer at an area defined by the lens-forming defining lines formed in the top defining lines-forming step, and curing the this lens-forming layer to form lens sections. The lens-laminating step comprising a series of these steps is repeated at least one time.

In this lens-laminating step, additional lens-forming defining lines are formed on the lens-forming defining lines formed on the substrate, and additional lens-forming resin composition is coated and cured on the lens sections formed on the substrate, thereby forming additional lens sections on the lens sections. In this case, the line width of the lens-forming defining lines formed on the substrate may be equal to, larger or smaller than that of the additional lens-forming defining lines.

(6) Lens-Laminating Step—No. 4—

This lens-laminating step comprises the defining lines-forming step (1) and the lens-forming step (2), followed by:

(i) the top defining lines-forming step of providing additional lens-forming defining lines on the lens-forming defining lines and lens sections already formed, and
(ii) the top lens-forming step of coating the surface of the lens sections already formed with a lens-forming resin composition having an angle of contact of at least 15 with the material for forming the lens-forming defining lines formed in the top defining lines-forming step mentioned above, to form a convex lens-forming layer at an area defined by the lens-forming defining lines formed in the top defining lines-forming step, and curing the this lens-forming layer to form lens sections. The lens-laminating step comprising a series of these steps is repeated at least one time.

In this lens-laminating step, the line width of the lens-forming defining lines formed on the substrate may be equal to, larger or smaller than that of the additional lens-forming defining lines.

By the lens-laminating step, a plurality of additional lens sections are formed on the lens sections formed on the substrate in the arranging direction thereof. Therefore, advantageously it is possible to design more complexed optical systems by the lens-forming step.

(7) Lens-Laminating Step—No. 5—

This lens-laminating step comprises the defining lines-forming step (1) and the lens-forming step (2), followed by:

(i) the top defining lines-forming step of providing additional lens-forming defining lines on the lens sections already formed, and
(ii) the top lens-forming step of coating the surface of the lens sections already formed and the lens-forming defining lens formed between the lens sections with a lens-forming resin composition having an angle of contact of at least 15° with the material for forming the lens-forming defining lines formed in the top defining lines-forming step mentioned above, to form a convex lens-forming layer at an area defined by the lens-forming defining lines formed in the top defining lines-forming step, and curing the this lens-forming layer to form lens sections. The lens-laminating step comprising a series of these steps is repeated at least one time.

In this lens-laminating step, lens-forming defining lines are provided on the lens sections formed on the substrate. The lens having the thus formed structure can have a more complicatedly designed optical system.

The article with lens or lenses will be in detail explained below.

(B) Method of Fabricating Articles with Lens

The method of fabricating the article with lens or lenses according to the present invention comprises (1) an image-making step, (2) a defining lines-forming step and (3) lens-forming step.

(1) Image-Making Step:

This image-making step comprises making an image on substrate. The image made on substrate, which is stereoscopically recognizable using an article with a lenticular lens, is image 2 comprising divided images 2a, 2b, 2c and 2d on substrate 1, as, for example, shown in FIG. 2 attached hereto, the divided images comprising right-eye images (images recognized with a right eye when viewed with both eyes) and left-eye images (images recognized with a left eye when viewed with both eyes) in a long strip form and alternately arranged. The image made on substrate may be visually recognizable as various images through the article with lens when viewed in different directions of view.

The substrate on which the image may be transparent or opaque.

When the substrate is transparent, an opaque layer may be provided on the opposite side of the substrate (the side opposite to that on which the lens sections are formed), so that the visual recognition of images does not become difficult due to a background viewed through both the lens and the transparent substrate. This opaque layer is also called a reflecting layer. In short, it is a layer having a function of reducing or losing the light transmission, so that the background cannot be viewed through. This reflecting layer can improve the recognizability of images by light reflection.

Figure 2:
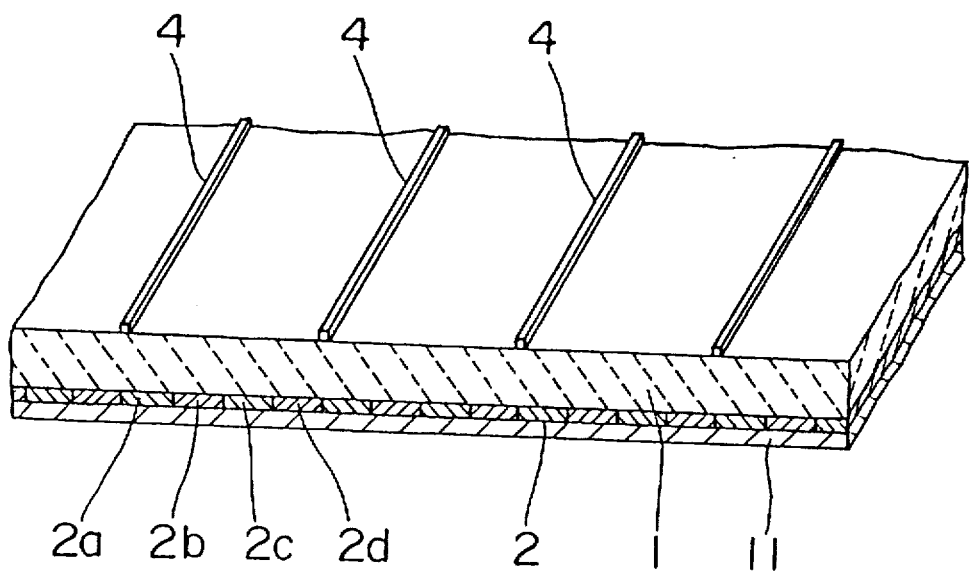
FIG. 2 is a perspective view of a substrate, image formed on the surface of the substrate, reflective layer formed on the image-formed surface, and lens-forming defining lines formed on the surface of the substrate at the side opposite to the image-formed side of the substrate in the method of fabricating the article with lens.

In the case where the transparent substrate is used, the substrate surface on which the image is made and the substrate surface on which the lens is formed may be different from each other. For example, as shown in FIG. 2, image 2 is made on substrate surface 1, and lens sections are formed on the substrate surface opposite to the surface on which the image 2 is made. In this case, the transparent substrate may function as a support for securing to self-sustain the article with lens and as a focus-regulator for regulating a focal length so that observing eyes are focused through the lens sections on the image. Furthermore, opaque layer (reflecting layer) 11 may be provided on the image 2. Even if the substrate is transparent, the lens sections may be provided on the substrate surface on which the image is made, as desired.

Figure 3:
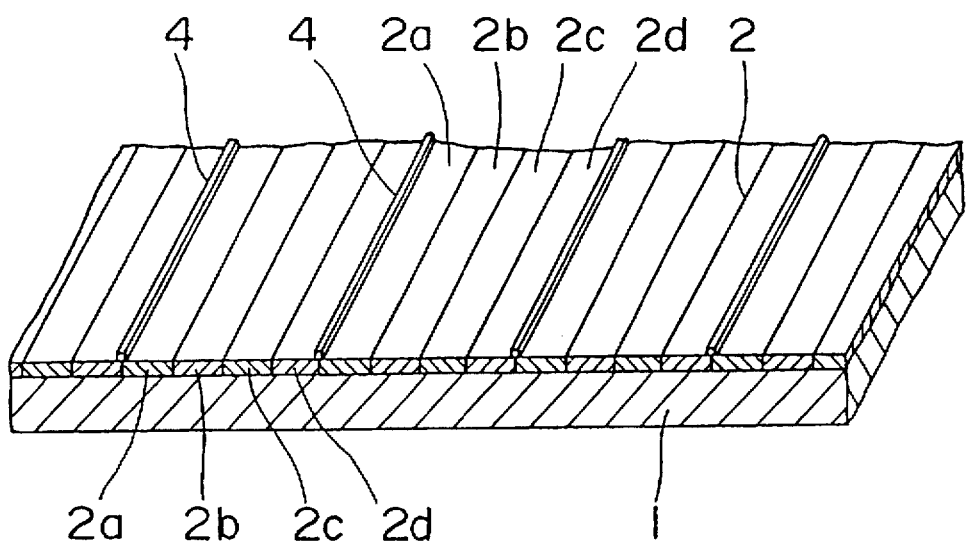
FIG. 3 is a perspective view of a substrate, image formed on the surface of the substrate, and lens-forming defining lines formed on the image-formed surface.

As shown in FIG. 3, the surface of substrate 1 on which image 2 is made may be the lens-forming surface.

The substrate may comprise a single layer or a laminate comprising a plurality of layers.

Figure 4:
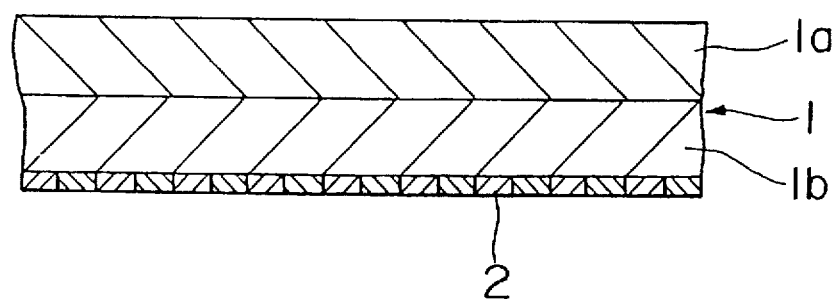
FIG. 4 is a vertical cross-sectional view of a substrate comprising a transparent laminate and image used in the method of fabricating an article with lens.

When substrate 1 is a laminate, as shown in FIG. 4, each of layers 1a and 1b may be transparent. In any event, the laminate of layers 1a and 1b functions as a support of securing to self-sustain the article with lens. When an image is to be visually recognized through a substrate at the lens-formed side thereof which is opposite to the image-made side thereof, each layer is naturally required to be transparent.

When the substrate comprises two or more transparent layers, at least one layer of these transparent layers functions as a support for realizing the self-sustaining of the article with lens, and the other layer or layers function as an auxiliary support for improving the self sustaining of the article with lens in cooperation with the transparent layer as support and, as desired, as a focal length-regulating layer for regulating the focal length of the lens sections so that the focus of the lens sections can be taken on the image surface.

Therefore, the material and thickness of the substrate having an image made on one side thereof are decided depending upon the self-sustainability, focal length, etc. of the substrate, when the image is viewed at the other side, regardless of whether the substrate is a single layer or a laminate of layers.

The material used for the substrate is not limited as far as it can have such functions as mentioned above and have an image made thereon. As the material used for a single transparent or opaque layer, reference may be made to, for example, a synthetic resin, glass, metal, paper, wood, pottery, porcelain or a material having one or more of these materials coated thereon.

The term "transparent" used herein means that the material is so transparent that an image can be recognized therethrough and includes "colorless transparent", "translucent", "colored transparent" and "colored translucent".

The substrate may have a flat surface, curved surface and optionally unevened surface.

(2) Defining Lines-Forming Step:

The defining lines-forming step (2) comprises providing lens-forming defining lines on the lens-forming surface of the substrate.

This defining lines-forming step is the same as the defining lines-forming step as explained in the method of producing a lens as mentioned above. The following is summarized.

Figure 5:
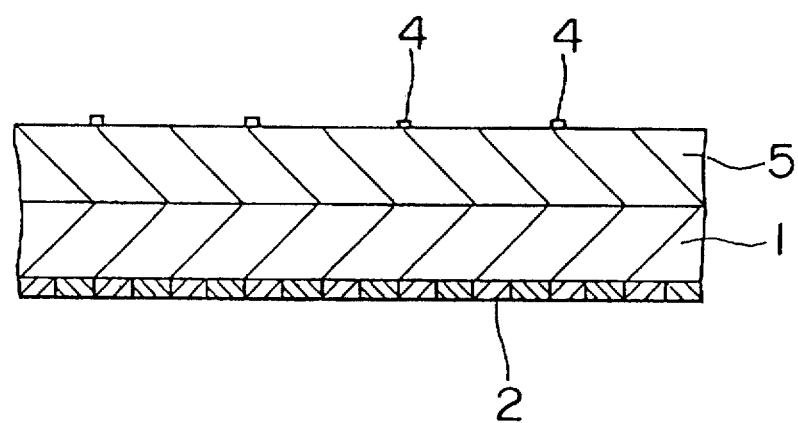
FIG. 5 is a vertical cross-sectional view of a substrate, image formed on the surface of the substrate, transparent layer laminated on the surface of the substrate at the side opposite to the image-formed surface, and lens-forming defining lines formed on the surface of the transparent layer, which are used in the method of fabricating an article with lens.

The lens-forming defining lines are formed on the lens-forming surface. This lens-forming surface may be the image-made surface (on which image 2 is made) of substrate 1, as shown in FIG. 3, a surface opposite to the image-made surface of substrate 1, as shown in FIG. 2, or a transparent layer laminated on the image-made surface of substrate 1, as shown in FIG. 5.

The aforementioned transparent layer is not limited as far as it can be transparent, but it is preferably a synthetic resin or resin composition. This transparent layer may be provided to regulate the focal length so that the focus of the lens sections can be put on the image. In this case, the thickness of the transparent layer is decided taking into account the focal length of the lens sections or length of view.

The lens-forming surface is preferably as flat as possible. The flatness or evenness of the lens-forming surface is the same as mentioned with the surface of the substrate.

When the flatness of the lens-forming surface is within the aforementioned range, formation by printing of the lens-forming defining lines and of the lens-forming layer can effectively be carried out. If the flatness of the lens-forming surface is poor, then the function of the whole lens finally produced may be lost.

If the flatness of the substrate is insufficient for the lens-forming surface, the aforementioned transparent layer may be formed on the surface of substrate to give a desired flatness to the surface of substrate.

This transparent layer may be formed by a dipping, brushing, spraying, coating with a roll coater or printing method, or the like. Formation of the transparent layer is preferably carried out by the coating method with a roll coater or the printing method. The printing method may include, for example, lithographic printing, letterpress printing, intaglio printing, gravure printing, screen printing, mimeographic printing, and the like. Particularly preferred is the gravure printing or lithographic printing.

The lens-forming defining lines are the same as the lens-forming defining lines mentioned in the method of producing a lens. Therefore, no detailed explanation is made.

Figure 6:
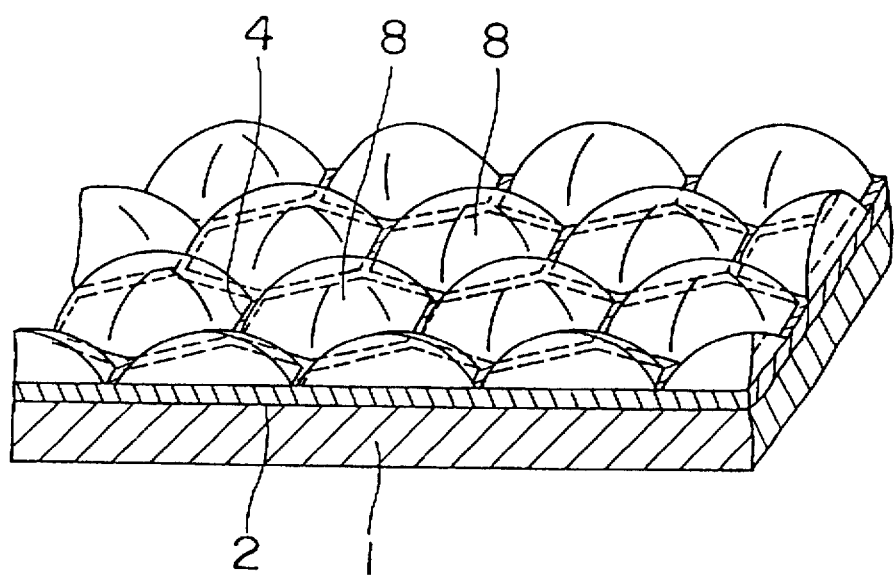
FIG. 6 is a perspective view of an article with lens having defining lines for forming a honeycomb-shaped lens, formed according to the method of fabricating the article with lens.
Figure 7:
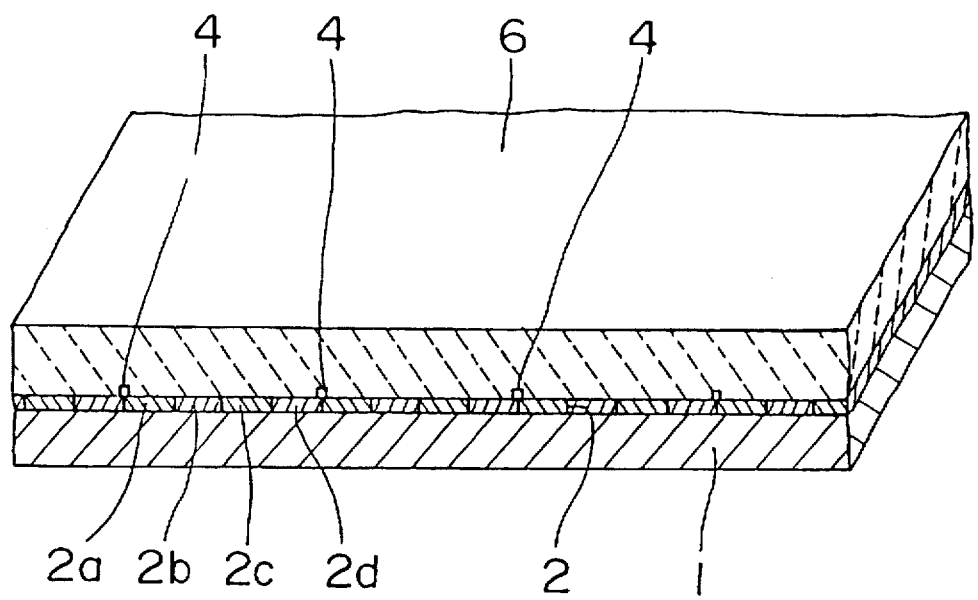
FIG. 7 is a perspective view of the substrate immediately after the surface thereof having an image and then lens-forming defining lines formed thereon was coated with a lens-forming resin composition in the method of fabricating the article with lens.

The shape of the lens-forming defining lines varies depending upon the lens sections to be formed. For example, when a lenticular lens is to be produced, the lens-forming defining lines 4 are formed in parallel to each other at a predetermined interval, as shown in FIGS. 3, 4 and 5. On the other hand, when a flyeye lens is to be produced, the lens-forming defining lines 4 are formed, for example, in a honeycomb form, as shown in FIG. 6.

When the image made on the substrate comprises divided images, the lens-forming defining lines are formed for every divided images. In detail, the divided images capable of be stereoscopically viewed in the simplest manner comprise right-eye images and left-eye images alternately arranged. In this case, a plurality of pairs of a right-eye image and a left-eye image are provided. In such simple divided images, the lens-forming lines are formed to interpose the pair of a right-eye image and a left-eye image therebetween. Actually, the left-eye image and other images are interposed between the right-eye image and the next right-eye image. Therefore, the lens-forming defining lines 4 are preferably formed for every pitches between a right-eye image and the next right-eye image.

The line width of the lens-forming defining lines, the interval between a lens-forming defining line and the adjacent lens-forming defining line and the method of forming the lens-forming defining lines are as mentioned above with the method of producing a lens.

(3) Lens-Forming Step:

This lens-forming step is substantially the same as mentioned above with the lens-forming step of the method of producing a lens. The key points thereof will be explained in detail.

In this lens-forming step, the lens-forming surface having lens-forming defining lines 4 thereon, which were formed in the aforementioned defining lines-forming step, is firstly coated with a lens-forming resin composition 6 which is insoluble in the lens-forming defining lines 4. This lens-forming resin composition will be referred to below. The coating on the lens-forming resin composition may be carried out by various methods such as dipping, brushing, spraying, coating with a roll coater and printing. Preferred are the methods of coating with a roll coater or printing.

The printing method may include, for example, lithographic printing, letterpress printing, intaglio printing, gravure printing, screen printing, mimeographic printing, and the like. When the interval between the lens-forming defining lines is fine as mentioned above, the thickness of the lens-forming resin composition coated is in the range of 0.3–500 µm, preferably 0.5–100 µm or, as desired, may be 0.3–200 µm or properly 0.3–50 µm.

Figure 8:
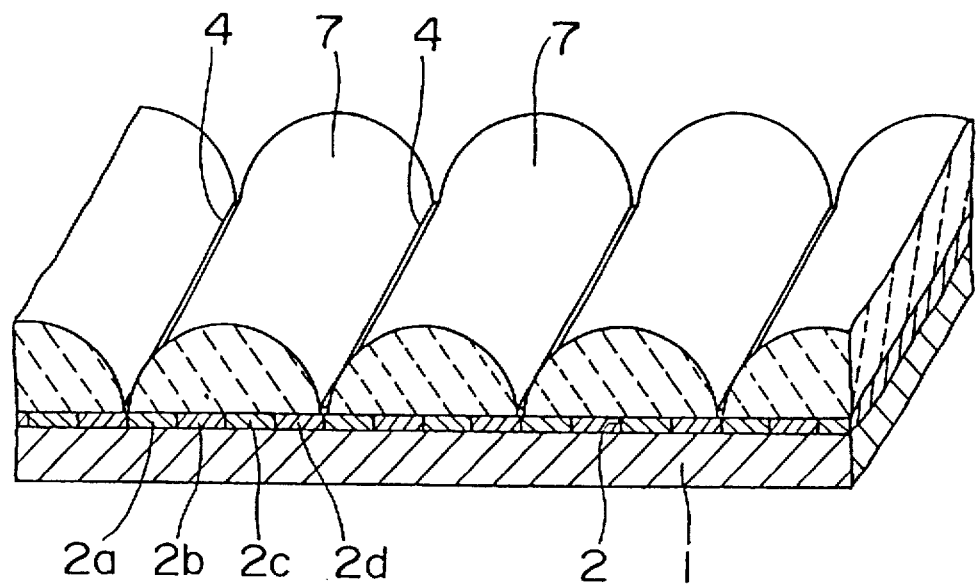
FIG. 8 is a perspective view showing the state of the coated lens-forming resin composition which was repelled by the lens-forming defining lines so that it has a vertical cross section in a convex form, in the method of fabricating the article with lens.

Applying the lens-forming resin composition so as to give such a thickness as mentioned above permits the resin composition to rise up in such a convex form as capable of forming a lens at the area defined by the lens-forming lines to form a lens-forming layer. The shape of the lens-forming resin composition rising up varies depending upon the pattern of the lens-forming defining lines. For example, when the lens-forming defining lines in a straight form are formed in parallel at a predetermined interval as shown in FIG. 8, the shape of the lens-forming layer 7 formed between the lens-forming defining lines is approximately in a semicylindrical convex form. When the lens-forming lines is formed in a honeycomb pattern, as shown in FIG. 6, the shape of the lens-forming layer 8 formed between the lens-forming defining lines 4 is approximately in a semispherical convex form.

The terms "semicylindrical convex form" used herein is not only meant by a cylinder cut to half in a longitudinal direction along the axis, but also by a cylinder or elliptic cylinder cut in a longitudinal direction along the axis or a line in parallel to the axis. The cross section across the axis or line is in a circular arc form. Furthermore, the terms "semispherical convex form" is not only meant by a complete semisphere, but also by a convex form obtained by cutting a sphere or elliptic sphere in parallel to the sphere plane.

In the present invention, the terms "semicylindrical convex form" is merely used as meaning the shape capable of functioning as a lens.

As the lens-forming resin composition was coated, the lens-forming layer made from the lens-forming resin composition is cured. This curing may be carried out by thermal curing or radiation curing. When the lens-forming resin composition of the present invention as mentioned below is cured by radiation curing. The radiation used includes ultraviolet rays, electron beam, etc. Conditions for the radiation curing will be referred to below in connection with the lens-forming resin composition of the present invention.

After the curing of the lens-forming layer was completed, a lens body comprising a plurality of the lens sections is formed on the surface of substrate. The procedures mentioned above can produce a monolayered lens body comprising a plurality of lens sections on the surface of substrate. At least one step of the subsequent lens-forming steps is repeated to produce the article with lens having a multi-layered structure comprising a plurality of laminated lens sections on the surface of substrate.

This lens-laminating step will be explained below.

(4) Lens-Laminating Step (No. 1):

This lens-laminating step of the method of fabricating the article with lens is substantially the same as mentioned with the "lens-laminating step—No. 1—" of the method of producing a lens. This lens-laminating step is in detail explained with reference to the "lens-laminating step—No. 1—" and summarized below with reference to the drawings.

In this lens-laminating step, transparent layer 5 is formed on the surface of image 2 made on substrate 1, straight lens-forming defining lines 4 are formed at a predetermined equal interval on the surface of transparent layer 5, and lens sections 9 formed at every areas defined by the lens-forming defining lines are coated thereon with filler resin composition 10.

This filler resin composition preferably has a refractive index different from that of a lens-forming resin composition used for forming the lens sections. As this filler resin composition can properly used a resin composition comprising the same components as or different components than those of the lens-forming resin composition and having a refractive index regulated by changing the proportions of the components.

The coating of the filler resin composition on the lens sections, thickness of the filler resin composition coated and functions of the filler layer formed of the filler resin composition are as mentioned above.

As the filler resin composition may be used the lens-forming resin composition which will be referred to below. In this case, the filler resin composition is cured with radiation to form the filler layer. Radiation used in this curing is ultraviolet rays or electron beam.

The formation of the filler layer is followed by the top defining lines-forming step.

(ii) Top Defining Lines-Forming Step:

This top defining lines-forming step is a step of forming the lens-forming defining lines on the flat top surface of the aforementioned filler layer, and substantially the same as the defining lines-forming step mentioned above, except that the surface on which the lens-forming defining lines are formed is the flat top surface of the filler layer in place of the surface of substrate. Therefore, no detailed explanation of this step is made.

Figure 10:
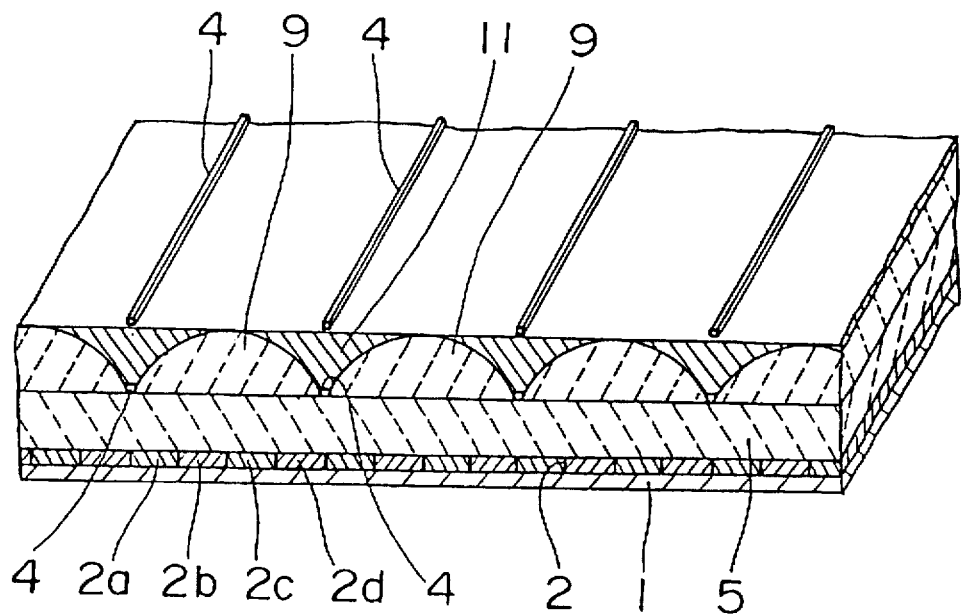
FIG. 10 is a perspective view of the top flat surface of the filler layer comprising a cured filler resin composition, having the lens-forming defining lines formed thereon, in the method of fabricating the article with lens.

FIG. 10 shows the straight lens-forming defining lines formed on the flat top surface of the filler layer 11.

Figure 11:
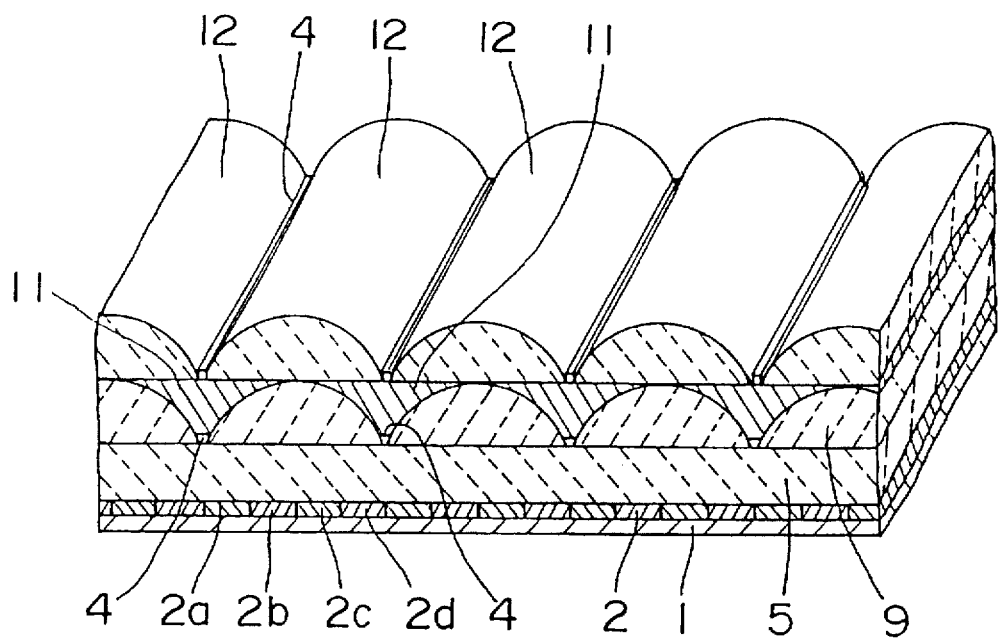
FIG. 11 is a perspective view illustrating the top lens-forming step in the method of fabricating the article with lens.

(iii) Top Lens-Forming Step:

This top lens-forming step comprises coating the surface of the filler layer 11 with a lens-forming composition having an angle of contact of at least 15° with a material of which the lens-forming defining lines 4 are formed in the aforementioned top defining lines-forming step, as shown in, for example, FIG. 11, to thereby form a convex lens-forming layer 12 on the areas defined by the lens-forming defining lines 4, and curing the lens-forming layer to form lens sections.

This step is substantially the same as the lens-forming step as mentioned above.

The lens-forming resin composition for forming the lens sections may be the same as the lens-forming resin composition used for forming the lowermost lens sections, but a resin composition having a different refractive index than that of the lens-forming resin composition used for forming the lowermost lens sections, the refractive index being changed by changing the components or proportions thereof of the resin composition.

The object of providing the filler layer and multistage lens sections is to realize the optical properties and/or high refractive indexes due to formation of interfaces, which cannot be attained by a monolayer lens sections on the substrate.

Therefore, the components or proportions thereof of the lens-forming resin compositions used in the second stage or subsequent stages are preferably decided taking into account the refractive index of the first stage lens sections and the refractive index of each of the second and subsequent stage lens sections so that the focus can be put on the surface of substrate.

The lens-laminating step comprising a series of (i) the top surface-flattening step, (ii) the top defining lines-forming step and (iii) the top lens-forming step may be repeated one time or many times.

Figure 12:
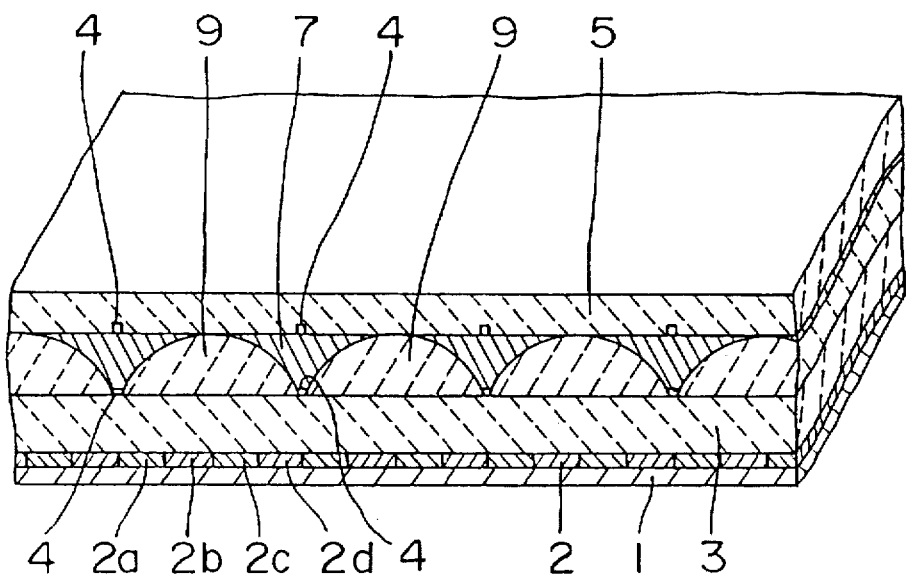
FIG. 12 is a perspective view showing the transparent layer formed between the first stage lens sections and the second stage lens sections in the top lens-forming step.

As shown in FIG. 12, between the first stage lens sections and the second stage lens formed on the first stage lens sections may be provided a transparent layer to regulate the focal length. In FIG. 12, the second stage lens is not shown. In the single stage lens sections as shown in FIG. 12, the filler layer and transparent layer may be provided on the top surface of the lens sections or the uppermost lens sections of the multistage lens sections.

(5) Lens-Laminating Step (No. 2):

This lens-laminating step is substantially the same as mentioned with the "Lens-laminating step—No. 2—" in the method of producing a lens as mentioned above. Therefore, no detailed explanation thereof is made.

(6) Lens-Laminating Step (No. 3):

This lens-laminating step is substantially the same as mentioned with the "lens-laminating step—No. 3—" in the method of producing a lens as mentioned above. Therefore, no detailed explanation thereof is made.

(7) Lens-Laminating Step (No. 4):

This lens-laminating step is substantially the same as mentioned with the "lens-laminating step—No. 4—" in the method of producing a lens as mentioned above. Therefore, no detailed explanation thereof is made.

(8) Lens-Laminating Step (No. 5):

This lens-laminating step is substantially the same as mentioned with the "lens-laminating step—No. 5—" in the method of producing a lens as mentioned above. Therefore, no detailed explanation thereof is made.

The article with lens of the present invention can be fabricated by the method of fabricating the article with lens as mentioned above.

The structure of the article with lens will be illustrated below.

Figure 13:
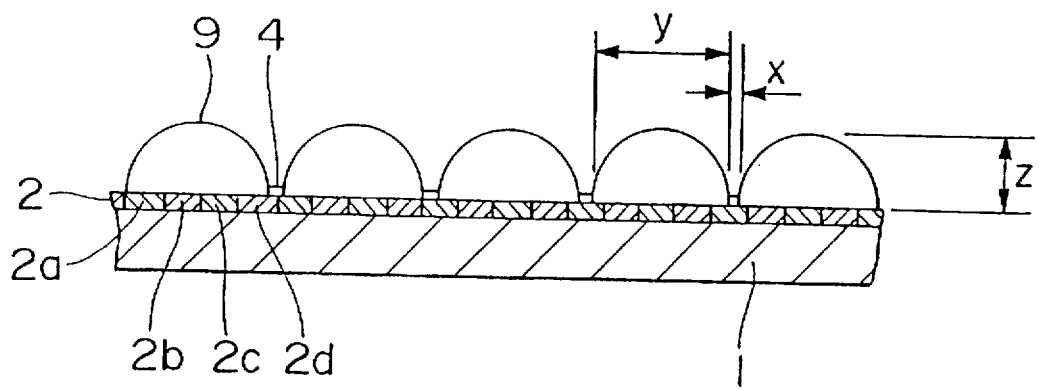
FIG. 13 is a cross-sectional view of an article with lens.

(C) Article with Lens:

The structure according to the present invention basically comprises substrate 1, image layer 2 comprising a plurality of divided images 2a, 2b, 2c and 2d formed on the image-making surface of the substrate, lens-forming defining lines 4 provided on the image layer at a predetermined interval for each of the sets of the divided images and lens sections 9 in a semicylindrical form formed between the lens-forming defining lines, as shown in FIG. 13. In the article with lens as shown in FIG. 13, the straight lens-forming defining lines having a width x are arranged in parallel at an intervaly.

Figure 14:
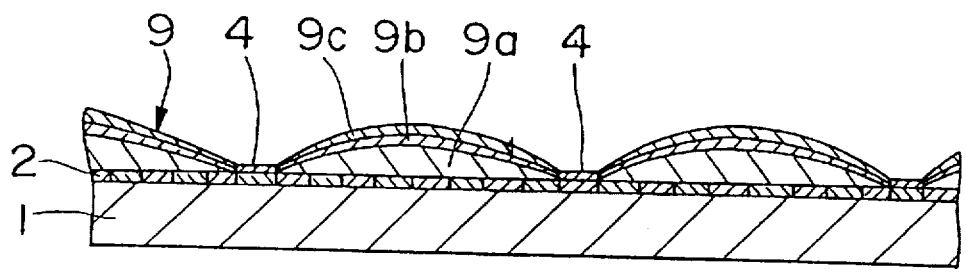
FIG. 14 is a cross-sectional view of an article with lens having lens sections and additional lens sections formed on the lens sections.

Another structure of the article with lens according to the present invention may comprise substrate 1, image 2 provided on the substrate 1, lens-forming defining lines 4 provided on the image layer in parallel to each other, and lens sections 9 comprising the first lens sections 9a, the second lens sections 9b on the first lens sections and the third lens sections 9c on the second lens sections, as shown in FIG. 14. The lens sections 9 as shown in FIG. 14 is a three-layer laminate, but it may be a multilayer laminate.

Figure 15:
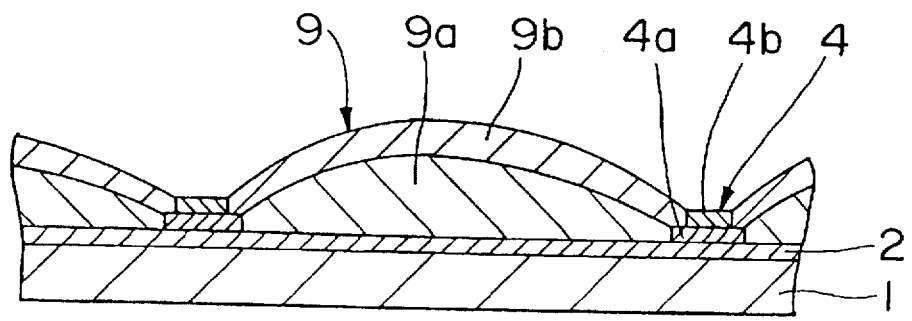
FIG. 15 is a cross-sectional view of an article with lens having lens-forming defining lines formed on the substrate and additional lens-forming defining lines on the lens-forming defining lines.

A further structure of the article with lens according to the present invention may comprise substrate 1, image layer 2 formed on the image-making surface of the substrate 1, first lens-forming defining lines 4a formed in parallel to each other, primary lens sections 9a formed on between the primary lens-forming defining lines 4a, secondary lens-forming defining lines 4b laminated on the primary lens-forming defining lines 4a and secondary lens sections 9b laminated on the primary lens sections 9a between the secondary lens-forming defining lines 4b, as shown in FIG. 15. In FIG. 15, the lens-forming defining lines 4 are formed in two stages, but may be formed in an optional number of stages. Furthermore, the lens sections may be formed in two stages, but may be formed in an optional number of stages.

Figure 16:
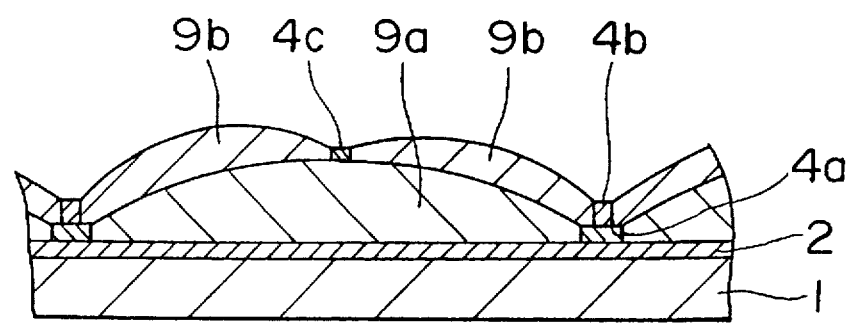
FIG. 16 is a cross-sectional view of an article with lens comprising lens-forming defining lines formed on a substrate, additional lens-forming defining lines formed on the aforementioned lens-forming defining lines, lens sections provided between the lens-forming defining lines, further lens-forming defining lines formed on the surface of the lens sections and additional lens sections formed on the aforementioned lens sections.

A still further structure of the article with lens according to the present invention may comprise substrate 1, image layer 2 formed on the image-forming surface of the substrate 1, primary lens-forming defining lines 4a formed in parallel to each other on the surface of image layer 2, primary lens sections 9a between the primary lens-forming defining lines 4a, secondary lens-forming defining lines 4b formed on the primary lens-forming defining lines 4a, third lens-forming defining lines 4c formed on the surface of the primary lens sections 9a, and secondary lens sections 9b on the primary lens sections 9a between the secondary lens-forming defining lines 4b and the third lens-forming defining lines 4c, as shown in FIG. 16. In FIG. 16, the laminated lens sections 9 is shown in a two-layer form as a matter of convenience, but may comprise an optional number of layers. Furthermore, the lens-forming defining lines 4 is a two-layer laminate but may be a multilayer laminate. In FIG. 16, one third lens-forming defining line 4c is shown on the surface of the primary lens sections 9a as a matter of convenience, but an optional number of the third lens-forming defining lines 4c may be formed on the surface of the primary lens sections 9a.

Figure 17:
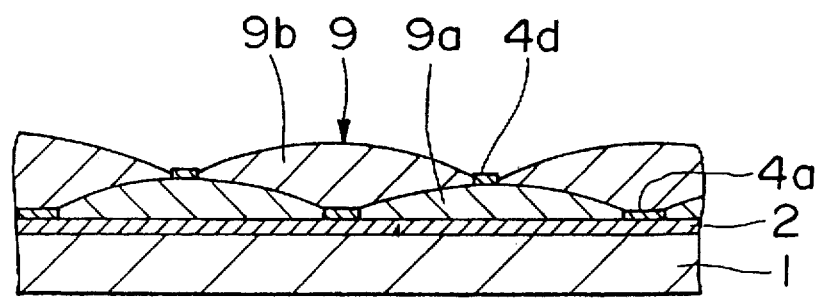
FIG. 17 is a cross-sectional view of an article with lens comprising lens-forming defining lines formed on a substrate, lens sections formed between the lens-forming defining lines, lens-forming defining lines formed on the lens sections, and additional lens sections formed on the lens and adjacent lens sections.

A still further structure of the article with lens according to the present invention comprises substrate 1, image layer 2 formed on the image-making surface of the substrate 1, primary lens-forming defining lines 4a formed in parallel to each other on the surface of the image layer, primary lens sections 9a formed between the primary lens-forming lines 4a, secondary lens-forming defining lines 4d formed on the surface of each of the primary lens sections 9a, secondary lens sections 9b formed between the secondary lens-forming defining lines 4d, as shown in FIG. 17. In FIG. 17, reference is made to the two-layer laminated lens sections 9 as a matter of convenience, but the laminate of the lens sections 9 may comprise a plurality of layers.

The article with lens according to the present invention may have no image-making layer. In more detail, the laminates having no image-making surface as shown in, for example, FIGS. 13 to 17, that is, a lens body having a structure containing a substrate and lens sections formed on the substrate may be included in the article with lens of the invention.

Regardless of the structure, the substrate of the article with lens varies depending upon uses of thereof.

For example, the substrate of the article with lens for a stereoscopic photograph is formed from a self-sustaining and thick material. As the material reference may be made to, for example, a synthetic resin sheet, synthetic resin film, metal foil, paper, glass, etc. The material may be in a plate, sheet or film form but is not limited to these forms.

When the article with lens is used for a photograph, design, cut, figure, sketch, pattern, symbol or a combination thereof in books, the substrate is a cover of book or sheet of book.

In the case of the article with lens having no image layer, being used as a light reflective layer, the substrate may be formed from an opaque material. As the opaque material reference may be made to, for example, a synthetic resin-made color sheet, synthetic resin-made color film, synthetic resin-made color plate, metal foil, paper, opaque glass, etc.

In the case of the article with lens having no image layer, being used as a light-transmitting body, the substrate may be formed from a transparent material. As the transparent material reference may be made to, for example, a synthetic resin-made transparent film, synthetic resin-made transparent plate transparent glass, etc.

Since the lens-forming defining lines and lens-forming layer can be formed by printing techniques for the article with lens according to the present invention, any materials capable of being printed thereon can be a substrate for the article with lens.

The substrate may be transparent or opaque. Selection of the substrate will be made in accordance with use of the article with lens.

The image made on substrate comprises divided images comprising right-eye images (images recognized with a right eye when viewed with both eyes) and left-eye images (images recognized with a left eye when viewed with both eyes) in a long strip form and alternately arranged.

The line width x of the lens-forming defining lines in the article with lens (for example, see FIG. 13) is usually 1–500 μm, preferably 1–400 μm, optionally 1–300 μm, 1–200 μm, 1–100 μm. Since the lens-forming defining lines have a very small line width, they are not practically a bar against visual recognition of images, so that one can clearly view the images.

The pitch intervaly between the lens-forming defining lines according to the present invention (for example, see FIG. 13) is usually in the range of 50–2,000 um, preferably 100–500 um. The lens-forming defining lines having the pitch interval within the range above are so highly fine that high precision stereoscopic images can be recognized.

Figure 9:
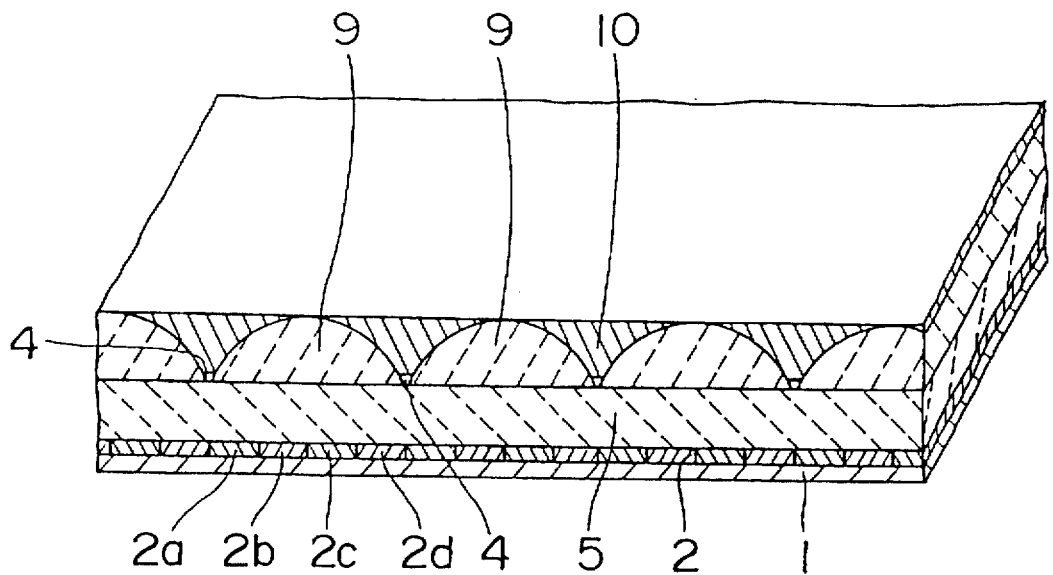
FIG. 9 is a perspective view of a substrate having an image formed surface, a transparent layer formed on the image-formed surface, lens-forming defining lines formed at a predetermined interval on the transparent layer, lens sections formed for respective intervals of the lens-forming defining lines and a filler resin composition coated on the lens sections, in the method of fabricating the article with lens.

These lens-forming defining lines can be formed on the image surface, i.e., the surface of the image layer, as shown in FIG. 13. As shown in FIG. 5, they may be formed on the side of the substrate opposite to the image layer side, or on the surface of the transparent layer formed on the image layer formed on the substrate, as shown in FIGS. 9 and 10.

One of the functions of the transparent layer is to regulate the focal length so as for the focus of the lens sections to meet the surface of the image layer. Therefore, the thickness of the transparent layer is appropriately decided taking into account the refractive index of the lens sections and the refractive index of the transparent layer, so that the function may be satisfied.

The lens sections are in a semicylindrical form having a cross-sectional shape approximately in a semicircular form (including an arc, bow, catenary, ellipse, etc. i.e., all convex forms functioning as a lens). The height z of the lens sections (for example, see FIG. 13) is usually in the range of 0.4–300 um, preferably 0.4–60 um. When the height of the lens sections is within the range above, a highly fine stereoscopic image can clearly be viewed.

The article with lens according to the present invention can have the lens sections comprising a plurality of layers, as shown in FIG. 11 as well as FIG. 13. As shown in FIG. 12, a filler layer can be formed between the lens sections, and a protective transparent layer formed on the surface of the filler layer. This protective transparent layer may function not only as a protector for the lens sections but also as a regulator for regulating the focal length of the lens sections.

(D) Defining Lines-Forming Resin Composition:

The lens-forming defining lines can be formed of a defining lines-forming resin. The defining lines-forming resin composition preferably has an angle of contact of at least 6° (not less than 6°) with a normal dodecan, a viscosity at 25° of at most 1,000 cps (not more than 1,000 cps) and a tackiness of at most 20 (not more than 20). When lens-forming defining lines are formed on a substrate of the defining lines-forming resin composition having the above-specified angle of contact, viscosity and tackiness, good lens-forming defining lines can easily be formed on the substrate. Particularly, very fine lens-forming defining lines can easily be formed by the method of coating with a roll coater or printing.

The tackiness cannot be expressed in terms of absolute units, but it can be measured by an inkometer. The inkometer is a tackiness-measuring apparatus having such a structure as that of a miniaturized and simplified printing apparatus. The tackiness is usually measured at 30° C. and 400 rpm.

The defining lines-forming resin composition having the aforementioned characteristics or properties repels the lens-forming resin composition when coated between the lens-forming defining lines formed of the defining lines-forming resin composition, so that the lens-forming resin composition can be formed in a lens form and the object of the present invention can be attained well. Furthermore, the defining line-forming resin composition having the aforementioned characteristics or properties can be shaped by various methods such as printing.

The defining lines-forming resin composition may include a resin composition containing as main components a rosin-modified phenol resin, linseed oil-modified alkyd resin and the like, and a dispersion force-regulator added for regulating an angle of contact and surface tension with normal dodecan.

The dispersion force-regulator may include a compound represented by Formula 1. Preferred example of the regulator may be a compound represented by Formula 2.

Formula 1:

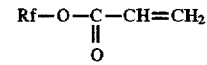

wherein Rf is a perfluoroalkyl group, alkenically perfluoroalkyl group, or perfluoroalkyl sulfonamide of 3 or more in carbon number, Formula 2:

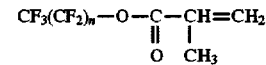

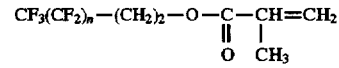

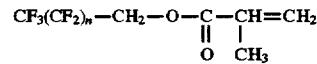

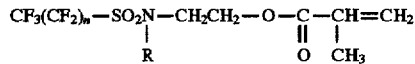

wherein R is an alkyl group of 1–8 in carbon number.

A preferred defining lines-forming resin composition comprises 30–60%, preferably 40–50% by weight of a rosin-modified phenol resin, 5–30%, preferably 10–15% by weight of linseed oil-modified alkyd resin, 0–45%, preferably 1–30% by weight of a dispersion force regulator, and 5–20%, preferably 7–10% by weight of a high boiling point petroleum solvent. A more preferred defining lines-forming resin composition may contain 5–30%, preferably 10–20% by weight of an extender pigment or a proper amount of a compound and drier, in addition to the aforementioned components. The proportions of the aforementioned components are selected so that the total weight of the components can be 100%.

(E) Lens-Forming Resin Composition:

The lens-forming resin composition used in the method of the present invention and for fabricating the article with lens should preferably have an angle of contact of at least 15° with a material for forming the lens-forming defining lines, for example, may contain a polymerizable material as far as it can have such an angle.

The polymerizable material may be a material capable of being thermally polymerized or polymerized with a radiation and ordinarily have a hardenable double bond-containing group.

This hardenable double bond-containing group is a group having a reactive double bond which is curable by reacting by an active radiation such as ultraviolet rays, visible rays, electron beam, or heating.

As the hardenable double bond-containing group or the reactive double bond-containing group, reference may be made to various materials, for example, functional groups such as acryloyl group, methacryloyl group, vinyl group or allyl group. Of these groups are preferred acryloyl group and methacryloyl group.

The functional groups having the acryloyl group or methacryloyl group may be acryloyloxy group or methacryloyloxy group, or a group represented by Formula 3:

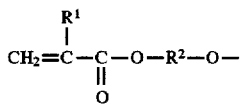

wherein $R^1$ is hydrogen atom or methyl group, $R^2$ an alkyl group (a branched alkylene group) of 1–12, preferably 1–5 in carbon number.

The further functional group containing the acryloyl group or methacryloyl group may not only be the group represented by Formula 3 but also a functional group represented by Formula 4:

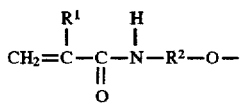

wherein $R^1$ and $R^2$ are the same as defined above, i.e., a radical of a hydroxyalkyl-substituted (meth)acrylamide, from the hydroxyl group of which hydrogen atom was removed, or another functional group represented by Formula 5:

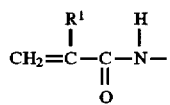

wherein $R^1$ is the same as defined above, i.e., a radical of a acrylamide or methacryloamide, from the amino group of which one hydrogen atom was removed.

Furthermore, the functional group containing allyl group may not only be allyl group itself, but also, for example, allyloxy group, and a functional group represented by Formulae 6, 7 and 8:

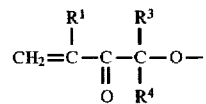

Formula 6

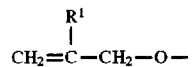

Formula 7

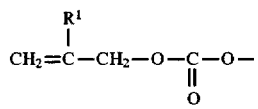

Formula 8 wherein $R^1$ is the same as defined above, and each of $R^3$ and $R^4$ is hydrogen atom or an alkyl group and may be different from or identical with each other, i.e., a radical of an allyl compound having one hydroxyl group, from which the hydroxyl group was removed.

As the polymerizable material reference may be made to, for example, the aforementioned hardenable double bond-containing group. As the hardenable double bond-containing group reference may be made to an epoxy resin, urethane resin, polyester resin, polyether, polyether polyol, polyethylene imine, polyamidoolygomer, alkylpolyslloxane and compounds of these resins containing bromine, fluorine, perfluoroalkyl group, silicon, iodine or an aromatic ring such as benzene ring in the main or branched chain. Of these polymers reference may preferably be made to the epoxy resin, urethane resin or polyester resin.

In another point of view, the preferred polymerizable materials used in the present invention is a (meth)acrylic polymerizable material derived from a polyhydric alcohol and (meth)acrylic acid, particularly an acrylic polymer derived from a polyhydric alcohol and acrylic acid.

In a further point of view, a polymerizable material containing acryloyl group and/or methacryloyl group and having a refractive index of 1.35 to 1.75. Using a polymerizable material having a refractive index in this range allows the formed lens sections to satisfactorily function as a lens.

As the polymerizable material used in the present invention, reference may be made to polymerizable monomers having a reactive double bond which are hardenable by irradiating them with ultraviolet rays, visible rays, electron beam, X-ray, etc. or heating. The terms "polymerizable monomers" used herein may broadly cover not only polymerizable low molecular weight compounds but also polymerizable oligomers and polymerizable prepolymers obtained by oligomerizing or polymerizing the low molecular weight compounds or polymers. There are differences in the viscosity between the polymerizable monomers, polymerizable oligomers and polymerizable prepolymers. When the final lens-forming resin composition is to be applied by coating with a roll coater or printing, the resin composition is allowed to have a viscosity suitable for the coating or printing, for example, 1,000 cps (25° C.) or lower, preferably by adjusting the combination or proportion of the monomers, polymerizable oligomers and polymerizable prepolymers.

The low molecular weight, so-called monomers used as the polymerizable monomers usually have a viscosity in the range of 2–10,000 cps. From these monomers is optionally selected a monomer having a suitable viscosity in this range. The viscosity of the polymerizable oligomers and polymerizable prepolymers is normally in the range of 100 to 10,000 cps. A compound having a suitable viscosity is selected from compounds having a viscosity in this range.

As the reactive double bond-containing group reference may be made to, for example, acryloyl group, methacryloyl group, vinyl group or allyl group. Of these is preferred the acryloyl group or methacryloyl group.

As the monomers used in the present invention reference may be made to an aromatic di(meth)acrylate monomer (normally having a viscosity of 600–1,600 cps) such as bisphenol A di(meth)acrylate ethoxide; a fluorine-containing (meth)acrylate monomer such as perfluoromethyl (meth)acrylate or perfluoroethyl (meth)acrylate; a glycol di(meth)acrylate monomer such as neopentylglycol diacrylate ethoxide (normally having a viscosity of 5–6 cps) or neopentyl glycoldiacrylate propoxide; a trimethylolpropane triacrylate monomer (normally having a viscosity of 80–120 cps) such as trimethylolpropane triacrylate (TMPTA) ethoxide (normally having a viscosity of 40–120 cps) or trimethylolpropane triacrylate propoxide; a multifunctional methacrylate monomer such as ethylene glycol dimethacrylate (normally having a viscosity of 2–8 cps), diethylene glycol dimethacrylate (normally having a viscosity of 2–8 cps), tripropylene glycol diacrylate (TPGDA) (normally having a viscosity of 5–30 cps), pentaerythritol triacrylate (PET30) (normally having a viscosity of 300–1,300 cps), dipentaerythritol acrylate (DPHA) (normally having a viscosity of 5,500–7,500 cps), 1,4-butandiol dimethacrylate (normally having a viscosity of 10 cps or less), 1,6-hexanediol methacrylate (normally having a viscosity of 5–8 cps), trimethylolpropane trimethacrylate (normally having a viscosity of 60–130 cps) or glycerin dimethacrylate; 2-hydroxyethyl methacrylate (normally having a viscosity of 4–5 cps), 2-hydroxypropyl methacrylate (normally having a viscosity of 5–6 cps), 2-hydroxyethyl acrylate (normally having a viscosity of 4–5 cps), 2-hydroxypropyl acrylate (normally having a viscosity of 5–6 cps), 2-hydroxybutyl acrylate (normally having a viscosity of 8–10 cps), diethylaminoethyl methacrylate, dimethylaminoethyl methacrylate quaternary compound, methacrylic acid, 2-methacryloyloxyethyl succinate (normally having a viscosity of 170–190 cps), 2-methacryloyloxyethyl phthalate (normally having a viscosity of 5,000–10,000 cps), glycidyl methacrylate, mono (2-methacryloyloxyethyl)acid phosphate, mono (2-acryloyloxyethyl)acid phosphate, etc. The acrylate represented by Formula 1 as well as the aforementioned materials may be used as the polymerizable monomer.

In addition, there may be used preferred polymerizable monomers such as KAYARAD DPHA (dipentaerythritol hexaacrylate) (normally having a viscosity of 5,500–7,500 cps), KAYARAD D-130, KAYARAD D-330 (dipentaerythritol alkyloyl trialkylate) (normally having a viscosity of 1,500–2,500 cps), KAYARAD DPCA-20 (caprolactam-modified dipentaerythritol hexaacrylate), KAYARAD DPCA-30 (normally having a viscosity of 1,000–2,000 cps), KAYARAD DPCA-60 (normally having a viscosity of 900–1,500 cps), KAYARAD DPCA-120 (normally having a viscosity of 1,500–2,700 cps), etc, all made by Nippon Kayaku Co., Ltd.

Of the aforementioned polymerizable monomers, are preferred multifunctional methacrylate monomers such as trimethylolpropane triacrylate (TMPTA) ethoxide, tripropyleneglycol diacrylate (TPGDA), pentaerythritol triacrylate (PET30), and dipentaerythritol triacrylate (DPHA).

As mentioned above, the monomers used in the present invention have a molecular weights of at most 10,000.

The various monomers as mentioned above may be used singly or in combination of two or more thereof.

The lens-forming resin composition according to the present invention can be cured by itself by applying activation rays such as ultraviolet rays, visible rays, electron beam or X-ray, or heating, which depends upon the kind of the polymerizable monomers. Some of the polymerizable monomers can be cured in the presence of a polymerization initiator by applying activation rays such as ultraviolet rays, visible rays, electron beam or X-ray, or heating.

The polymerization initiator used under application of, for example, ultraviolet rays or visible rays may include 1-hydroxycyclohexyl phenyl ketone, dibenzoyl, benzoylmethyl ether, benzoylethyl ether, benzoinmethyl ether p-chlorobenzophenone, p-methoxybenzophenone, benzoyl peroxide or di-tert-butyl peroxide or camphorquinone. In addition, a thioxantone polymerization initiator such as 2,4-diethyl thioxantone or isopropyl thioxantone, or 2-methyl-1-{4-(methylthio) phenyl}-2-monpholinopropane-1 may be used.

These polymerization initiators may be used singly or in combination of two or more thereof.

In the case where the heating curing method and the normal temperature curing method are used, peroxide compounds or amine compounds are preferably used singly or in combination thereof. As the peroxide compounds reference may be made to benzoyl peroxide, p-chlorobenzoyl peroxide, 2,4-dichlorobenzoyl peroxide, t-butylhydroperoxide, di-t-butyl peroxide, dicumyl peroxide, t-butylperoxyacetate, diacetate, t-butylperoxybenzoate, etc. Furthermore, as the amine compounds, reference may be made to N,N-diethanol-p-toluidine, dimethyl-p-toluidine, p-toluidine, methylamine, t-butylamine, methylethylamine, diphenylamine, 4,4'-dinitrodiphenylamine, o-nitroaniline, p-bromoaniline, 2,4,6-tribromoaniline, etc.

A shrinkage controller may be incorporated in the lens-forming resin composition according to the present invention for preventing the shrinkage occurring when cured. As the shrinkage controller may be used substances which can prevent the shrinkage of the lens-forming resin composition when cured and do not damage the transparency of the lens sections.

The substances may be, for example, barium sulfate, silica, alumina white, calcium carbonate, etc.

In another point of view, transparent fillers may be used as the shrinkage controller.

At any rate, of these shrinkage controller and transparent filler are preferred barium sulfate and silica.

The lens-forming resin composition of the present invention may contain a solvent for adjusting the fluidability thereof. The solvent suitable for use in the present invention may be an aromatic solvent such as toluene or xylene, mineral oil such as mineral spirits, and an alkyl ketone such as dimethyl ketone, methylethyl ketone, methylpropyl ketone, methylisobutyl ketone, etc.

One example of the proportion of the components of the lens-forming resin composition according to the present invention may be 50–95 wt %, preferably 60–95 wt % of the polymerizable material, 0–5 wt %, preferably 0.1–1 wt % of the shrinkage controller, and 1–15 wt %, 3–12 wt % of the polymerization initiator. When the proportions above fall within the above respective ranges, the lens-forming resin composition of the present invention can have a well regulated viscosity suitable for coating and an appropriate surface tension when coated on the lens-forming surface, so that the good lens sections can be formed. Furthermore, the shrinkage of the lens-forming resin composition is inhibited to a large extent when cured. Therefore, a lens having a higher quality optical performance can be produced.

The lens-forming resin composition of the present invention can be obtained by mixing the aforementioned components in the aforementioned proportions.

The lens-forming resin composition of the present invention may contain at least the polymerizable material and have a viscosity of 20–1,000 cps, preferably 30–800 cps (25° C.) and a color number measured by Gardener scale (hereinunder referred to as "Gardener color number") of 1–10, preferably 1–5, more preferably 1–3. Alternatively, this lens-forming resin composition may be curable with an electron beam having an energy of 1,000 mJ/cm2.

The lens-forming resin composition of the present invention has a refractive index of preferably 1.3–1.9.

When the viscosity of the lens-forming resin composition falls within the aforementioned range, the lens-forming resin composition can easily be coated on the lens-forming surface by coating with a roll coater or printing, and swells in a convex form with an appropriate angle of contact by the lens-forming defining lines. When the lens-forming resin composition is cured with an electron beam having the aforementioned range of energy amount irradiated, it is hardened for a short time under a shrinkage-prevented condition. The lens sections cured has excellent transparency due to the aforementioned range of color number.

The "Gardener color number" is determined in accordance with the Gardener scale regulated by 4.12 JIS K5400 (General Testing Method for Paints). For example, it is determined with a Heliege vanish calorimeter No. 600-DA from Heliege Company using a colorless, transparent glass-made Gardener color number tube having an inner diameter of 10 mm and a depth of 100 mm.

Regulation of the viscosity of the lens-forming resin composition within the aforementioned range is preferably carried out with the kind and proportion of the monomers. Regulation of the Gardener color number of the lens-forming resin composition within the aforementioned range is preferably realized with an improved purity of the polymerizable resin and monomers, or a selected high transparency polymerization initiator. Polymerization within the aforementioned range of energy amount irradiated is preferably realized with a selected kind and proportion of the polymerization initiator.

The polymerizable material, polymerization initiator, antifoamer, shrinkage controller or transparent filler is conveniently selected from the aforementioned compounds and well known materials, so as to come into the aforementioned ranges of viscosity, Gardener color number and energy amount irradiated.

In another aspect of the lens-forming resin composition of the present invention, reference thereto may be made as follows:

The lens-forming defining lines formed on an image comprising divided visual expressions should preferably be as fine as possible because the lens-forming defining lines are non-lens parts. In order to diminish the line width of the lens-forming defining lines, they should be precisely formed and the lens-forming resin composition should have a large angle of contact.

The lens-forming resin composition satisfying the aforementioned requirements contains the polymerizable material and has an angle of contact of at least 15°, preferably 50° or more, particularly preferably 90° or more with the lens-forming defining lines.

The lens-forming resin composition having the aforementioned range of angle of contact is greatly repelled by the lens-forming defining lines. Even if the lens-forming defining lines are very fine, the lens-forming resin composition applied between the lens-forming defining line swells well in a convex form, and the lens-forming resin composition is not allowed to run over the adjacent area between the lens-forming defining lines. Therefore, the line width of the lens-forming defining lines in the method of producing a lens and the method of fabricating an article with lens according to the present invention can be made as small as, for example 0.02 mm with the lens-forming resin composition. Accordingly, the article with lens having a less amount of afterimages can be obtained from the lens-forming resin composition.

The angle of contact of the defining lines-forming resin composition with the defining lines-forming resin composition is determined by falling one drop of the lens-forming resin composition onto the defining lines-forming resin composition-coated surface, curing the spread drop after the spreading stopped and determining the angle of contact. This was already in detail explained above.

[EXAMPLE]

Example 1

(1) Preparation of Defining Lines-Forming Resin Composition:

A defining lines-forming resin composition was prepared which comprised 20 wt % of an extender pigment, 50 wt % of a rosin-modified phenol resin, 12 wt % of a linseed oil-modified alkyd resin, 8 wt % of a high boiling point petroleum solvent, 2 wt % of a dryer, 2 wt % of a compound and 6 wt % of a dispersion force regulator.

The defining lines-forming resin composition had an angle of contact of 12.5 with a normal dodecan, a viscosity of 700 cps and a tackiness of 7.5.

(2) Preparation of Lens-Forming Resin Composition:

A lens-forming resin composition was prepared which comprised 52.5 wt % of neopentylglycolpropane diacrylate as a polymerizable monomer, 31 wt % of trimethylolpropane triacrylate ethoxide, 6 wt % of pentaerythritol triacrylate, 5 wt % of dipentaerythritol hexaacrylate, 5 wt % of hydroxycyclohexylphenyl ketone as a polymerization initiator and 0.5 wt % of barium sulfate as a shrinkage controller.

The Gardener color number of the lens-forming resin composition was 1. The viscosity of the lens-forming resin composition was 267 cps. The angle of contact of the lens-forming resin composition was 56° with the lens-forming defining lines-forming resin composition.

(3) Formation of Lens Sections:

Parallel and fine lens-forming defining lines were formed by printing from the aforementioned defining lines-forming resin composition on a visually expressed divided image-printed substrate surface of 1 mm thick (lens-forming surface, surface roughness Ra of 0.051 [cut-off value: 0.25, Gaussian].

The lens-forming defining lines formed of the defining lines-forming resin composition had a line width of 0.06 mm and a line interval of 0.3 mm.

The lens-forming resin composition of 15 μm thick was coated with a roll coater on the lens-forming defining lines-formed substrate surface.

Immediately after coating, the state of the lens-forming resin composition coated was observed to find that the lens-forming layer was formed in a semicylindrical convex form at each of the areas formed by the lens-forming defining lines.

Then, an ultraviolet ray of 400 mJ/cm$^2$ was applied over the lens-formed layer at a predetermined distance from the ray to cure the lens-forming layer, thereby forming lens sections.

The height of the lens sections was 23 μm.

The thus obtained article with lens was viewed at the side of the lens to stereoscopically see an image.

INDUSTRIAL UTILIZATION

The method of producing a lens according to the present invention makes it possible to form the lens sections by an easy way such as coating or printing. In other words, the method of producing a lens according to the present invention makes it possible to form the lens without using a metal mold. Thus, since the lens can be formed by coating or printing without using a metal mold, the objective lens can be mass-produced for a short period of time. This is highly industrial. Furthermore, for example, the printing technique can easily change the shape and pattern of the lens and, therefore, lens designs can easily be changed.

This method of producing a lens is carried out without using a metal mold and hence the lens can be produced precisely. Furthermore, various materials can be used as a substrate and hence various applications of articles with the lens can be expected. Particularly, the lens can be produced over the broad area of a substrate, even if the substrate cannot be used in a roll heating method of producing a lens.

The article with lens fabricated by the method of producing a lens according to the present invention may include, for example, a light reflecting plate, light transmitting plate and light scattering plate. Furthermore, this article with lens may be used as a stereoscopic viewer for a television set in which images formed on the image surface of the television set can stereoscopically be seen.

This stereoscopic viewer will be in detail explained. The article with lens fabricated by the method of producing a lens according to the present invention is mounted onto the image surface of a cathode ray tube image surface or liquid crystal image surface of a television set. Scanning lines are made on the cathode ray tube image surface or liquid crystal image surface so that the scanning lines of even number and odd number may correspond to, for example, a right-eye image and a left-eye image, respectively. The article with lens is mounted on the cathode ray tube image surface or liquid crystal image surface, so that each lens body of the lens sections in the article with lens may correspond to each of the scanning lines. An observer can observe the right-eye image with his right eye and the left-eye image with his left eye through the article with lens, so that he can observe the stereoscopic image. Thus, one can enjoy the stereotelevision through the article with lens of the present invention.

The method of producing a lens according to the present invention makes it possible to fabricate an article with lens through which one can view a stereoscopic image, an article with lens through which one can view different images at changed angles of view or an article with lens having special visual expressions, by easy operation such as coating or printing. Particularly, this method of fabricating the article with lens requires no metal mold to form the lens sections and, therefore, warp-free lens sections can be formed and various materials can be used for the substrate. Therefore, various applications of the articles with lens fabricated by the method of fabricating the article with lens according to the present invention can be expected. For example, such applications include books, news papers, magazines, plates and towers for advertisement, posters, calendars, photographs or marks such as pictographs, packages, or emblems. Furthermore, in accordance with this method of fabricating the article with lens, the steps of making images and forming the lens are continuously carried out. Therefore, there is no warp due to shear between the image and the lens and to shrinkage and thus many kinds of images are precisely made. The article with lens can be applied to a substrate over part of the whole of the surface thereof.

From the defining lines-forming resin composition according to the present invention, the lens-forming defining lines can easily be formed on the lens-forming surface by coating or printing. Therefore, very fine defining lines can be obtained. Particularly, the lens design can be changed within a broad range by controlling the viscosity of the defining lines-forming resin composition by changing the proportion of the components thereof.

From the lens-forming resin composition according to the present invention, the lens sections can easily be formed on the substrate by coating or printing. Since the viscosity of the resin composition can be arbitrarily changed by selecting the kind of the polymerizable monomers, the coating techniques and printing techniques can widely be selected.

I claim:

1. A method for producing a lens which comprises:
providing lens-forming defining lines on a surface of a substrate;
coating the surface defined by the lens-forming defining lines with a lens-forming resin composition having an angle of contact of at least 15° with a material used for forming the lens-forming defining lines to form a lens forming layer in a convex shape, wherein the material used for the lens-forming defining lines has an angle of contact of at least 6° with N-dodecane, a viscosity of at most 1,000 cps (25° C.) and a tackiness of 20 or less; and
curing the lens-forming layer to produce plural sequential lenses.

2. A method according to claim 1, further comprising:
filling an uneven surface of the plural sequential lenses with a filler resin composition having a refractive index being different from a refractive index of the lens forming resin composition so as to produce a filler layer having a flat surface over the uneven surface;
providing second lens-forming defining lines on the flat surface;
coating the flat surface defined by the second lens forming defining lines with a lens-forming resin composition having an angle of contact of at least 15° with the material used for forming the lens-forming defining lines to form a second lens-forming layer in a convex shape; and
curing the second lens-forming layer to produce second plural sequential lenses.

3. A method according to claim 1, wherein the substrate is a laminate comprising a transparent layer and a transparent base sheet, and at least one of the transparent layer and the base sheet has the lenses formed on the outer surface thereof.

4. A method according to claim 1, wherein the substrate is a laminate comprising a transparent layer and an opaque base, and the transparent layer has the lenses formed on the outer surface thereof.

5. A method according to claim 1, wherein the lens-forming defining lines constitute a repeated pattern.

6. A method according to claim 2, wherein the lens-forming defining lines constitute a repeated pattern.

7. A method according to claim 5, wherein the repeated pattern is constituted by parallel curved or straight lines.

8. A method according to claim 6, wherein the repeated pattern is constituted by parallel curved or straight lines.

9. A method according to claim 5, wherein the repeated pattern is constituted by circles or polygons.

10. A method according to claim 6, wherein the repeated pattern is constituted by circles or polygons.

11. A method according to claim 1, wherein at least one of the lens-forming defining lines and the lens-forming layer is formed by coating with a roll coater or by printing.

12. A method according to claim 2, wherein the filler layer is formed by coating with a roll coater or by printing.

13. A method according to claim 3, wherein the transparent layer is laminated on the base sheet by coating with a roll coater or by printing.

14. A method according to claim 4, wherein the transparent layer is laminated on the base sheet by coating with a roll coater or by printing.

15. A method for fabricating an article with lenses which comprises:

making an image on a substrate;

providing lens-forming defining lines on a surface of the substrate having the image;

coating the surface defined by the lens-forming defining lines with a lens-forming resin composition having an angle of contact of at least 15° with a material used for forming the lens-forming defining lines to form a lens-forming layer in a convex shape; and curing the lens-forming layer to produce plural sequential lenses.

16. A method according to claim 15, further comprising:

forming a transparent layer on a surface of the substrate having the image before providing the lens-forming defining lines; and the lens-forming defining lines being provided on a surface of the transparent layer.

17. A method according to claim 15, wherein the image comprises a plurality of divided images and the lens-forming defining lines are formed along divisional lines of the divided images.

18. A method for producing a lens which comprises:

providing lens-forming defining lines on a surface of a substrate;

coating the surface defined by the lens-forming defining lines with a lens-forming resin composition having an angle of contact of at least 15° with a material used for forming the lens-forming defining lines to form a lens forming layer in a convex shape, wherein the lens-forming resin composition contains a polymeric substance, and has a viscosity of 20 to 1,000 cps (25° C.) and a number of colors of 1 to 10 as measured by the Gardener's method; and curing the lens-forming layer to produce plural sequential lenses.

19. A method according to claim 18, further comprising:

filling an uneven surface of the plural sequential lenses with a filler resin composition having a refractive index being different from a refractive index of the lens forming resin composition so as to produce a filler layer having a flat surface over the uneven surface;

providing second lens-forming defining lines on the flat surface;

coating the flat surface defined by the second lens forming defining lines with a lens-forming resin composition having an angle of contact of at least 15° with the material used for forming the lens-forming defining lines to form a second lens-forming layer in a convex shape; and curing the second lens-forming layer to produce second plural sequential lenses.

20. A method according to claim 18, wherein the substrate is a laminate comprising a transparent layer and a transparent base sheet, and at least one of the transparent layer and the base sheet has the lenses formed on the outer surface thereof.

21. A method according to claim 18, wherein the substrate is a laminate comprising a transparent layer and an opaque base, and the transparent layer has the lenses formed on the outer surface thereof.

22. A method according to claim 18, wherein the lens-forming defining lines constitute a repeated pattern.

23. A method according to claim 18, wherein at least one of the lens-forming defining lines and the lens-forming layer is formed by coating with a roll coater or by printing.

24. An article with lenses which is produced by:

making an image on a substrate;

providing lens-forming defining lines on a surface of the substrate having the image;

coating the surface defined by the lens-forming defining lines with a lens-forming resin composition having an angle of contact of at least 15° with a material used for forming the lens-forming defining lines to form a lens forming layer in a convex shape; and curing the lens-forming layer to produce plural sequential lenses.

* * * * *